US008819441B2

(12) United States Patent (10) Patent No.: US 8,819,441 B2
Murao et al. (45) Date of Patent: Aug. 26, 2014

(54) LONG-TERM SIGNATURE SERVER, LONG-TERM SIGNATURE TERMINAL, AND LONG-TERM SIGNATURE VERIFICATION SERVER

(75) Inventors: Shinichi Murao, Chiba (JP); Masakazu Uehata, Chiba (JP); Koichi Shibata, Chiba (JP)

(73) Assignee: Seiko Instruments Inc. (JP)

( * ) Notice: Subject to any disclaimer, the term of this patent is extended or adjusted under 35 U.S.C. 154(b) by 153 days.

(21) Appl. No.: 13/508,752

(22) PCT Filed: Jul. 6, 2010

(86) PCT No.: PCT/JP2010/061458
§ 371 (c)(1),
(2), (4) Date: Aug. 2, 2012

(87) PCT Pub. No.: WO2011/058785
PCT Pub. Date: May 19, 2011

(65) Prior Publication Data
US 2012/0303963 A1 Nov. 29, 2012

(30) Foreign Application Priority Data
Nov. 13, 2009 (JP) .................................. 2009-259523

(51) Int. Cl.
*H04L 9/32* (2006.01)
*G06F 15/16* (2006.01)
*G06F 21/64* (2013.01)
(52) U.S. Cl.
CPC .............. *G06F 21/64* (2013.01); *H04L 9/3247* (2013.01); *H04L 9/3297* (2013.01); *H04L 9/3236* (2013.01); *H04L 9/3268* (2013.01); *H04L 2209/68* (2013.01)
USPC .............. 713/178; 713/176; 713/189; 726/26

(58) Field of Classification Search
CPC ..... G06F 21/64; H04L 9/3247; H04L 9/3297; H04L 9/3236; H04L 9/3268; H04L 2209/68
USPC ............................. 713/176, 178, 189; 726/26
See application file for complete search history.

(56) References Cited

U.S. PATENT DOCUMENTS

| 7,574,607 B1 | 8/2009 | Liu et al. ........................ 713/181 |
| 2005/0120217 A1 | 6/2005 | Fifield et al. ................... 713/176 |

(Continued)

FOREIGN PATENT DOCUMENTS

| GB | 2378865 | 2/2003 |
| JP | 2005142661 | 6/2005 |
| JP | 2008041016 | 2/2008 |
| WO | 2004079986 | 9/2004 |

OTHER PUBLICATIONS

Denshi Bunsho Choki Hozon Handbook, Next Generation Electric Commerce Promotion Council of Japan, Mar. 2007, pp. 123-151.

(Continued)

*Primary Examiner* — Haresh N Patel
(74) *Attorney, Agent, or Firm* — Adams & Wilks

(57) ABSTRACT

A long-term signature server includes a signing target data acquisition function for acquiring signing target data, a signature data transmission function for transmitting to a long-term signature terminal signature data for the electronic-signing of the acquired signing target data, a signature value reception function for receiving an electronic signature value of the signing target data generated using the signature data transmitted from the long-term signature terminal, a time stamp acquisition function for acquiring a time stamp corresponding to the received electronic signature value, and a signature data generation function for generating basic signature data using at least the acquired signing target data, the received electronic signature value, and the acquired time stamp.

15 Claims, 12 Drawing Sheets

(56) References Cited

U.S. PATENT DOCUMENTS

| | | | |
|---|---|---|---|
| 2005/0289078 A1* | 12/2005 | Wary et al. | 705/64 |
| 2006/0120345 A1* | 6/2006 | Sung et al. | 370/351 |
| 2006/0271482 A1* | 11/2006 | Bito et al. | 705/50 |
| 2007/0083766 A1* | 4/2007 | Farnham et al. | 713/176 |
| 2007/0087751 A1* | 4/2007 | Voyer et al. | 455/436 |
| 2008/0040808 A1 | 2/2008 | Tokie | 726/26 |
| 2008/0097753 A1* | 4/2008 | Oura | 704/214 |
| 2008/0288779 A1* | 11/2008 | Zhang et al. | 713/178 |
| 2008/0307247 A1* | 12/2008 | Uehata | 713/500 |
| 2009/0119192 A1* | 5/2009 | Munoz Soro et al. | 705/30 |
| 2009/0151006 A1* | 6/2009 | Saeki et al. | 726/28 |
| 2010/0042836 A1* | 2/2010 | Shon et al. | 713/168 |
| 2010/0174650 A1* | 7/2010 | Nonaka | 705/44 |

OTHER PUBLICATIONS

ETSI TS 101 903, V1.1.1 (Feb. 2002), XML Advanced Electronic Signatures (XAdES), European Telecommunications Standards Institute, 2002 [retrieved on May 1, 2012], Retrieved from the Internet: <URL:http://www.etsi.org>.

ETSI TS 101 733, V1.5.1. (Dec. 2003), Electronic Signatures and Infrastructures (ESI); Electronic Signature Formats, European Telecommunications Standards Institute, 2003 [retrieved on May 1, 2012], Retrieved from the Internet: <URL:http://www.etsi.org>.

European Search Report mailed Apr. 14, 2014 issued in European Patent Appln. No. EP 10 82 9745.8.

* cited by examiner

LONG-TERM SIGNATURE SERVER, LONG-TERM SIGNATURE TERMINAL, AND LONG-TERM SIGNATURE VERIFICATION SERVER

CROSS-REFERENCE TO RELATED APPLICATIONS

This application is a U.S. national stage application of International Application No. PCT/JP2010/061458 filed Jul. 6, 2010, claiming a priority date of Nov. 13, 2009, and published in a non-English language.

BACKGROUND OF THE INVENTION

1. Technical Field

The present invention relates to a long-term signature server, long-term signature terminal, and long-term signature verification server, and for example, relates to forming of long-term signature data.

2. Background Art

In order to authenticate electronic data, electronic signing is performed by encrypting electronic data with a private key and an electronic signature, which is verified by the electronic data being decrypted using a public key which corresponds to the private key, is widely used.

Due to the electronic data being decrypted using the public key, it is possible to recognize that the electronic data has been encrypted using the private key which corresponds to the public key, and it is possible to confirm that the electronic data is by the signatory since it is the signatory that has the private key. By way of comparison, the private key functions as a seal and the public key functions as a seal certificate.

The public key is distributed using a public key certificate which is issued by a certifying authority and those who receive the distribution are able to confirm the authenticity of the public key using the certificate.

However, in order to deal with the compromising and the nature of the encryption algorithm which is used for the signature and the like in the electronic signature, an expiry date is set.

In addition, even before the expiry date, there are cases where the all of the certificates are revoked from the root certificate due to being revoked by circumstances relating to the signatory, loss of the private key, or the like.

Therefore, in order to cope with this problem, as shown in Patent Literature 1, an electronic signature format (below, long-term signature format) is regulated for making the validity of the electronic signature permanent.

This regulation is defined overseas by RFC5126 or ETSI TS 101 733 and is defined in Japan by JIS standard (JIS X 5092/5093).

The long-term signature format is configured from ES, STS, ES-T, verification information, ES-XL, ATS (1st, 2nd, . . . ) as shown in FIG. 1. This content will be described later in an embodiment.

FIG. 11 is a diagram for describing a configuration example of a long-term signature system 100 in the related art.

The long-term signature system 100 is configured from a long-term signature server 101 which is disposed at the client side, a CA repository 103 which exists in an external network 102, a TSA 104, and the like.

First, the long-term signature server 101 receives electronic data which is a signing target (hash value of original data) (step 5), signs the electronic data with the private key and generates ES (step 10), is applied with a signature time stamp by being sent to a TSA 104 (step 15), and outputs an ES-T (step 20).

Next, the long-term signature server 101 receives the ES-T which has been output (step 25), acquires revocation information from a CA repository 103 (step 30), and determines whether the revocation information has been issued after a certain period of time has passed (step 35). This is for acquiring the latest revocation information.

Next, the long-term signature server 101 acquires a certifying pass of a certificate (step 40) and applies verification information using the revocation information and the certifying pass (step 45).

Then, the long-term signature server 101 generates information which is the basis for ATS, electronically signs, and generates ATS by applying the time stamp using the TSA 104 (step 50) and outputs an ES-A (step 55).

It is possible to acquire long-term signature data in the manner described above, however there is a problem in that the long-term signature server 101 is disposed at the user side and it is necessary that operation management be performed at the user side.

In addition, since it is not easy to estimate the usage rate of the long-term signature data and the immediate effect is difficult to sense by the user, there are problems where the initial installation cost does not match the assumed costs of the user and it is difficult to install the long-term signature system.

In relation to this problem, for example, as shown in FIG. 12, it is possible for it to be dealt with by a method where a third party operates the long-term signature server 101 and the user forms long-term signature data by accessing the long-term signature server 101 from a client terminal 106.

However, in this case, it is necessary that the user transmit original data (internal document data and the like) which is a signing target of the long-term signature data to the long-term signature server 101 other than entrusting the private key which is used as the electronic signature to the long-term signature server 101, and there is a problem that it is necessary that confidential information (the private key, the original data) be released to the outside.

In addition, it is necessary that the confidential information be provided to a verification server in the same manner as the verification of the long-term signature data, or that a verification server be provided in-house.

CITATION LIST

Patent Literature

[PTL 1] JP-T-2003-533940

SUMMARY OF THE INVENTION

The present invention has the object of forming and verifying long-term signature data at a server side while holding a private key and the like at a client side.

Solution to Problem

According to a first aspect of the present invention, there is provided a long-term signature server which is provided with signing target data acquisition means for acquiring signing target data, signature data transmission means for transmitting signature data for electronic-signing signing target data which has been acquired to a long-term signature terminal, signature value reception means for receiving an electronic signature value of the signing target data which has been generated using the signature data which has been transmitted from the long-term signature terminal, time stamp acquisition means for acquiring a time stamp with regard to the electronic signature value which has been received, and signature data generation means for generating basic signature data using, at least, the signing target data which has been acquired, the electronic signature value which has been received, and the time stamp which has been acquired.

The long-term signature server is provided with function value and certificate reception means for receiving a function value which is calculated from original data using a predetermined function and a public key certificate which includes a public key which corresponds to a private key which is used in generation of the electronic signature value from the long-term signature terminal, and the signing target data acquisition means acquires the signing target data by generating the signing target data using, at least, the function value and the public key certificate which have been received.

The long-term signature server is provided with verification information acquisition means for acquiring verification information for verifying the public key certificate and the time stamp which have been received, and the signature data generation means adds the verification information which has been acquired to the basic signature data.

The long-term signature server is provided with long-term verification information acquisition means for acquiring long-term verification information for verifying the basic signature data for a predetermined period of time and the signature data generation means generates the long-term signature data by adding the long-term verification information which has been acquired to the basic signature data which has been generated.

The long-term signature server is provided with long-term verification information forming information transmission means for transmitting long-term verification information forming information for forming the long-term verification information to the long-term signature terminal and long-term verification information forming function value reception means for receiving a long-term verification information forming function value which has been calculated using a predetermined function by adding the original data to the long-term verification information forming information which has been transmitted from the long-term signature terminal, and the long-term verification information acquisition means acquires the long-term verification information by the time stamp being applied to the long-term verification information forming function value which has been received.

The long-term signature server is provided with long-term signature data reception means for receiving the long-term signature data from the long-term signature terminal, long-term verification information extraction means for extracting the long-term verification information from the long-term signature data which has been received, and further long-term verification information acquisition means for acquiring further long-term verification information for verifying the long-term verification information which has been extracted for a predetermined period of time, and the signature data generation means updates the long-term signature data by adding the further long-term verification information which has been acquired to the long-term signature data which has been received.

The long-term signature server is provided with another long-term verification information forming information transmission means for transmitting further long-term verification information forming information for forming further long-term verification information to the long-term signature terminal and further long-term verification information forming function value reception means for receiving a further long-term verification information forming function value, which is calculated using a predetermined function by adding the original data to the further long-term verification information forming information which has been transmitted, from the long-term signature terminal, and the further long-term verification information acquisition means acquires the further long-term verification information by applying the time stamp to the further long-term verification information forming function value which has been received.

In the long-term signature server, the signing target data includes a function value which is calculated from the public key certificate which has been received using a predetermined function. Here, the function value which is calculated from the public key certificate using the predetermined function also includes a function value which is calculated from, using the predetermined function, a signing target property which includes the function value which is calculated from the public key certificate using the predetermined function.

In the long-term signature server, the long-term signature terminal includes program transmission means for transmitting a long-term signature terminal program which, using a computer, realizes an electronic signature function which electronically signs using a private key, a public key certificate transmission function which transmits a public key certificate of a public key which corresponds to the private key to the long-term signature server, a function value transmission function which transmits a function value which is calculated from the original data using a predetermined function to the long-term signature server, a signature data reception function which receives signature data for electronically signing the signing target data, which has been generated using the public key certificate and the function value which have been transmitted, from the long-term signature server, and a signature value transmission function which electronically signs the signing target data by the electronic signature function using the signature data which has been received and transmits an electronic signature value from the electronic signature to the long-term signature server.

In another aspect, the present invention is directed to a long-term signature terminal provided with electronic signature means for electronically signing using a private key, public key certificate transmission means for transmitting a public key certificate of a public key which corresponds to the private key to a long-term signature server, function value transmission means for transmitting a function value which is calculated from original data using a predetermined function to the long-term signature server, signature data reception means for receiving signature data for electronically signing the signing target data, which has been generated using the public key certificate and the function value which have been transmitted, from the long-term signature server, and signature value transmission means for electronically signing the signing target data by the electronic signature means using the signature data which has been received and for transmitting an electronic signature value from the electronic signature to the long-term signature server.

The long-term signature terminal is provided with long-term verification information forming information reception means for receiving long-term verification information forming information for forming long-term verification information, which verifies basic signature data which includes a function value, a public key certificate, and an electronic signature value which have been transmitted for a predetermined period of time, from the long-term signature server, long-term verification information forming function value generation means for generating a long-term verification information forming function value by adding the original data to the long-term verification information forming information which has been received and by calculating long-term verification information forming information where the original data has been added using a predetermined function, and long-term verification information forming function value transmission means for transmitting the long-term verification information forming function value which has been generated to the long-term signature server.

The long-term signature terminal is provided with long-term signature data transmission means for transmitting long-term signature data, which includes the basic signature data including the function value, the public key certificate, and the electronic signature value which have been transmitted and the long-term verification information for verifying the same for a predetermined period of time, to the long-term signature server, further long-term verification information forming information reception means for receiving further long-term verification information forming information for forming further long-term verification information, which verifies the long-term verification information of the long-term signature data which has been transmitted for a predetermined period of time, from the long-term signature server, further long-term verification information forming function value generation means for generating a further long-term verification information forming function value by adding the original data to the further long-term verification information forming information which has been received and calculating further long-term verification information forming information where the original data has been added using a predetermined function, and further long-term verification information forming function value transmission means for transmitting the further long-term verification information forming function value which has been generated to the long-term signature server.

In yet another aspect, the present invention is directed to a long-term signature verification program which causes a computer to realize: an electronic signature function which electronically signs using a private key; a public key certificate transmission function which transmits a public key certificate of a public key which corresponds to the private key to the long-term signature server; a function value transmission function which transmits a function value which is calculated from the original data using a predetermined function to the long-term signature server; a signature data reception function which receives signature data for electronically signing the signing target data, which has been generated using the public key certificate and the function value which have been transmitted, from the long-term signature server; a signature value transmission function which electronically signs the signing target data by the electronic signature function using the signature data which has been received and transmits an electronic signature value from the electronic signature to the long-term signature server.

Still another aspect of the present invention is directed to a long-term signature verification server which is provided with long-term signature data reception means for receiving long-term signature data, which is configured using signing target data, verification information for verifying the signing target data, and long-term verification information which includes long-term verification information for verifying the signing target data and the verification information for a predetermined period of time, for verifying the authenticity of original data from a verifier terminal, long-term verification information forming information transmission means for forming long-term verification information forming information by extracting predetermined information which includes the long-term signature data and for transmitting the long-term verification information forming information which has been formed to the verifier terminal, long-term verification information forming function value receiving means for receiving a long-term verification information forming function value, which is calculated using a predetermined function by adding the original data to the long-term verification information forming information which has been transmitted, from the verifier terminal, and long-term verification information verification means for verifying the long-term verification information using the long-term verification information forming function value which has been received.

The long-term signature verification server is provided with signing target data verification means for verifying the signing target data using the verification information, and the long-term verification information verification means verifies the long-term verification information after the verification of the signing target data verification means.

In another embodiment, a long-term signature verification server which is provided with signature data reception means for receiving signature data which includes an electronic signature value and a public key certificate of a public key which corresponds to a private key which is used in generation of the signature value, function value reception means for receiving a function value using a predetermined function of original data, function value confirmation means for decrypting the electronic signature value using the public key certificate and for confirming the authenticity of the function value which has been received by comparing with the value which has been decrypted and the function value which has been received, and certificate confirmation means for confirming the authenticity of the public key certificate using a certificate which relates to a certifying pass which verifies the authenticity of the public key certificate.

According to the present invention, it is possible to form and verify long-term signature data at a server side while a private key and original data which are difficult to take outside of a company are held at a client side by processing using a private key and the like being undertaken by a client terminal.

DETAILED DESCRIPTION OF THE INVENTION

(1) Concept of Embodiment

Figure 1:
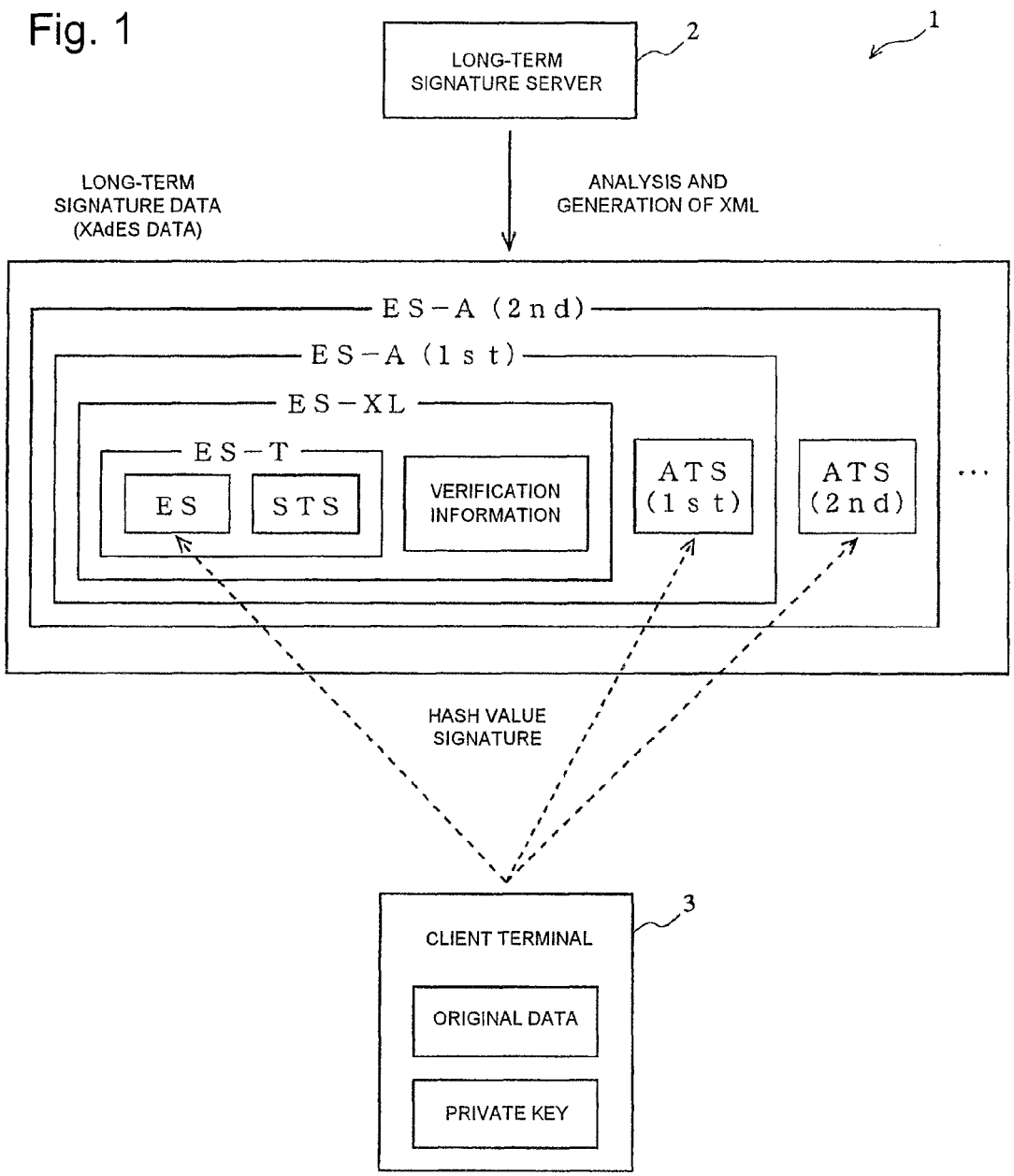
FIG. 1 is a diagram for describing the concept of an embodiment.

FIG. 1 is a diagram for describing the concept of an embodiment.

Long-term signature data is configured by arranging ES, STS, verification information, ATS (1st), ATS (2nd), . . . in a predetermined long-term signature format.

Among the elements of the long-term signature data, those for which processing using a private key and original data are necessary are ES and ATS.

In a long-term signature system 1, by processing for which the original data and the private key are necessary being performed by a client terminal 3 and processing where the long-term signature data is analyzed and generated being performed by a long-term signature server 2, it is possible that the long-term signature data is generated in the long-term signature server 2 while the original data and the private key are held in an inner portion of the client terminal 3.

In more detail, in the client terminal 3, the original data is held in the client terminal 3 by being transmitted to the long-term signature server 2 by a hash value being calculated with regard to the original data and the private key is held in the client terminal 3 by receiving data for forming an ES from the long-term signature server 2 and electronic signing this using the private key.

On the other hand, the long-term signature server 2 performs analysis and generation of XML which is a descriptive format of a long-term format.

In this manner, in the long-term signature system 1, the processing where the long-term signature data is formed is separated from the processing using the private key and the original data and the processing where the analysis and generation of XML is performed, and by the former being undertaken in the client terminal 3 and the latter being undertaken in the long-term signature server 2, it is possible that the generation of the long-term signature data is outsourced to the long-term signature server 2 while the private key and the original data are held in the client terminal 3.

(2) Details of Embodiment

Figure 2:
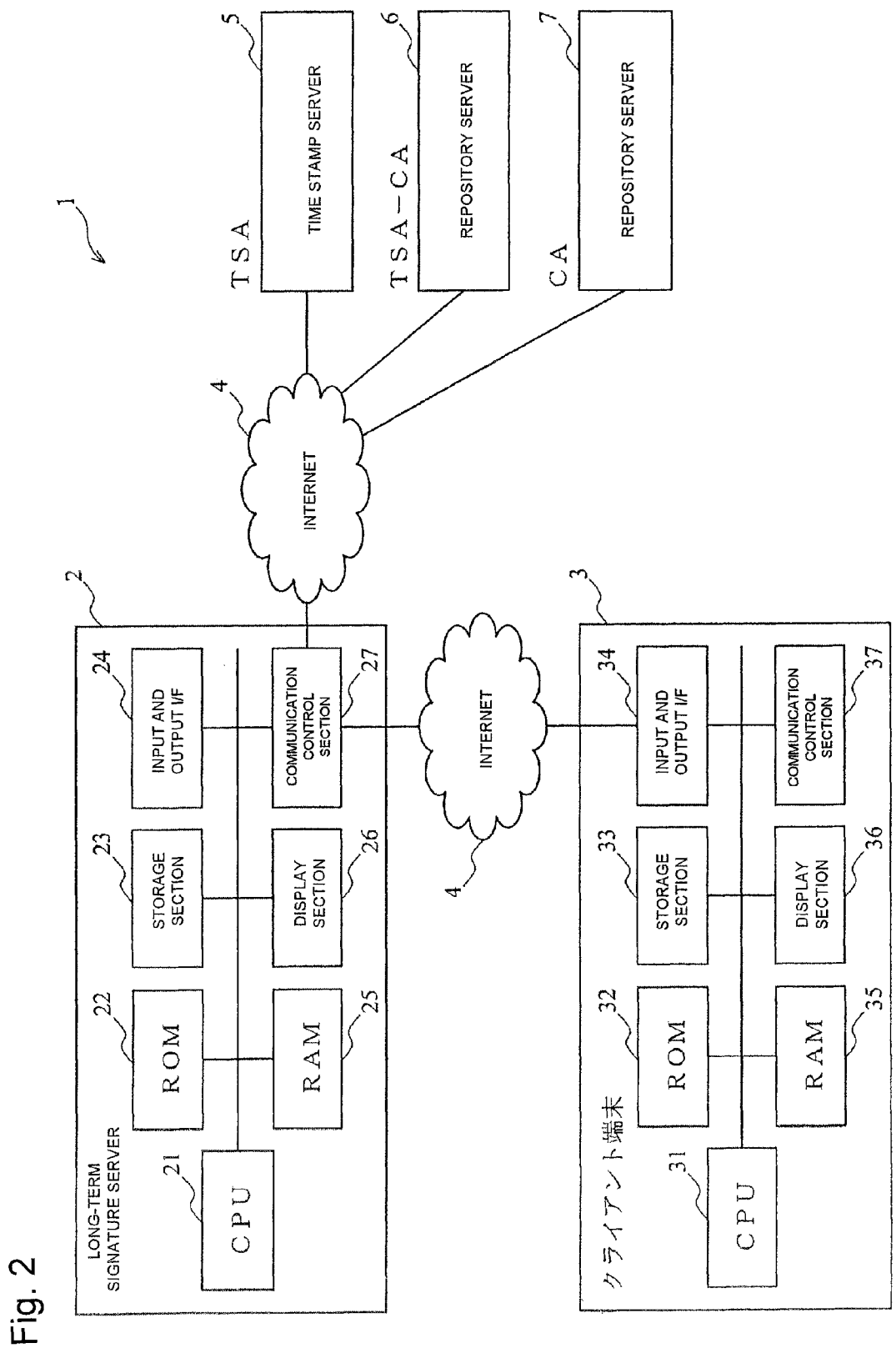
FIG. 2 is a diagram for describing the configuration of a long-term signature system.

FIG. 2 is a diagram for describing the configuration of the long-term signature system 1.

The long-term signature system 1 is configured by the long-term signature server 2, the client terminal 3, a time stamp server 5, repository servers 6 and 7, and the like being connected so as to be able to communicate via the Internet 4.

The long-term signature server 2 is configured from a CPU (Central Processing Unit) 21, a ROM (Read Only Memory) 22, a storage section 23, an input and output I/F 24, a RAM (Random Access Memory) 25, a display section 26, a communication control section 27, and the like.

The CPU 21 is a central processing device which performs information processing and control of each section in the long-term signature server 2 according to a program which is stored in the storage section 23 or the like.

In the embodiment, the long-term signature data is formed while the client terminal 3, the time stamp server 5, and the repository servers 6 and 7 communicate.

The ROM 22 is a read only memory and stores basic programs, parameters, and the like for operating the long-term signature server 2.

The RAM 25 is a random access memory and provides a working memory and the like for forming of the long-term signature data by the long-term signature server 2 communicating with the client terminal 3 and the like.

The storage section 23 is configured using, for example, a large capacity storage device such as a hard disk and stores an OS (Operating System) for operating the long-term signature server 2, a program for forming the long-term signature data, and the like.

The display section 26 is configured using, for example, a display device using a liquid crystal, CRT (Cathode Ray Tube), or the like, and displays each type of screen for an operation manager of the long-term signature server 2 or the like to operate the long-term signature server 2.

The input and output I/F 24 is provided with, for example, an input and output device such as switches for each type of operation, a keyboard, or a mouse, and the operation manager or the like is able to operate the long-term signature server 2 from the input and output I/F 24.

The communication control section 27 communicates with the client terminal 3, the time stamp server 5, the repository servers 6 and 7, and the like via the Internet 4. Here, the Internet 4 may be a network with another format.

The long-term signature server 2 is able to receive the electronic signing value, the hash value of the original data (below, original hash value), public key certificate, and the like from the client terminal 3 using the communication control section 27.

The client terminal 3 is configured from a CPU 31, a ROM 32, a storage section 33, a communication control section 34, a RAM 35, a display section 36, an input and output I/F 37, and the like.

The CPU 31 is a central processing device which performs information processing and control of the each section of the client terminal 3 according to a program which is stored in the storage section 33 and the like.

In the embodiment, reception and transmission of each type of information with the long-term signature server 2, electronic signing using the private key, and the like are performed.

The ROM 32 is a read only memory and stores basic programs, parameters, and the like for operating the client terminal 3.

The RAM 35 is a random access memory, and for example, provides a working memory when the client terminal 3 performs electronic signing or forming of the original hash value while communicating with the long-term signature server 2.

The storage section 33 is configured using, for example, a large capacity storage device such as a hard disk and stores an OS (Operating System) for operating the client terminal 3, the private key for performing electronic signing, the public key certificate of the public key which corresponds to the private key, the original data which is the long-term signing target, and the like.

As the original data, for example, each type of data file such as image data and audio data as well as an electronic document which is formed using a word processor, text editor, or the like are possible.

In addition, a program for the client terminal 3 to form the long-term signature data (which is formed using JAVA® or the like) may be configured so as to be downloaded from the long-term signature server 2 each time of formation, or is able to be stored in the storage section 33 in advance and configured so that this is used.

The display section 36 is provided with, for example, a display device using a liquid crystal, CRT, or the like, and displays each type of screen for a user of the client terminal 3 to operate the client terminal 3.

The input and output I/F 37 configures, for example, an input and output device such as a keyboard, a mouse, an IC card reader/writer.

The IC card reader/writer mediates communication between the client terminal 3 and an IC card by connecting with the IC card.

The IC card is an information processing device which is provided with a CPU, a ROM, a RAM, an EEPROM, (Electrically Erasable and Programmable ROM), or the like, and for example, stores user certifying information for certifying a user who uses the client terminal 3.

In addition, it is possible to configure the client terminal 3 so that the private key, the public key certificate, and the like are stored in the IC card and there is electronic signing by using the private key of the IC card.

The communication control section 34 performs communication with the long-term signature server 2 via the Internet 4. The transmission of the hash value of the long-term signature server 2, the transmission of the electronic signature value, and the like are performed using the communication control section 34.

The time stamp server 5 is a server which issues a time stamp and is disposed at a TSA (Time Stamp Authority).

The time stamp server 5 has an accurate clock which is corrected due to a timing which is distributed by a timing distribution authority and issues a time stamp due to electronic signing (encryption) using the private key for time stamping where the current date and time are given using the clock when electronic data which is a target of time stamp issuance is received.

The repository server 6 is a server which is disposed at a TSA-CA (Time Stamp Authority Certificate Authority) and provides revocation information of the public key certificate (public key certificate of the public key which corresponds to the private key which uses the time stamp) which is used in the verification of the time stamp.

Since the public key certificate which is not listed up in the revocation information has not been voided, due to this, it is possible to confirm the validity of the public key certificate and to confirm the validity of the time stamp using the public key certificate which is valid.

The repository server 7 is a server which is disposed at a CA (Certificate Authority) and provides revocation information of the public key certificate (public key certificate of the public key which corresponds to the private key of the client terminal 3) which is used in the verification of the electronic signing which has been performed by the client terminal 3.

Since the public key certificate which is not listed up in the revocation information has not been voided, due to this, it is possible to confirm the validity of the public key certificate and to confirm the validity of the electronic signing which has been performed by the client terminal 3 using the public key certificate which is valid.

The revocation information which is provided to the repository server 6 and the repository server 7 is updated periodically or non-periodically (for example, every 24 hours).

Figure 3:
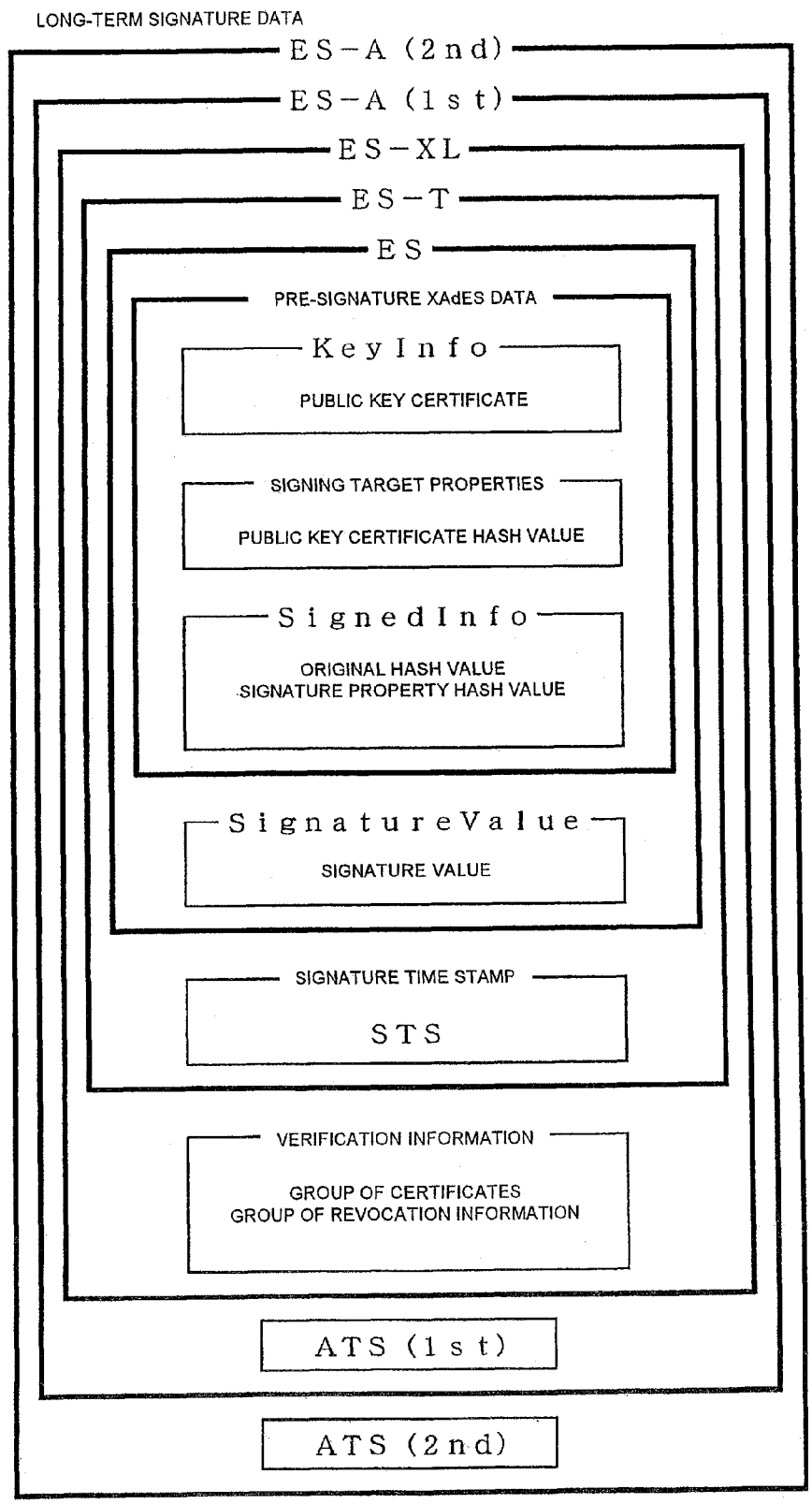
FIG. 3 is a diagram for describing a long-term signature format.

FIG. 3 is a diagram for describing a format of the long-term signature data (long-term signature format) which is used in the embodiment.

The long-term signature data in the embodiment follows the regulations of the XAdES (XML Advanced Electronic Signatures) and is written using XML (Extensible Markup Language) language.

The pre-signature XAdES data is an XML element which contains signing target data which is a target where the client terminal 3 performs electronic signing and is configured from each element of KeyInfo, signing target property, and SignedInfo. An ES is generated by the client terminal 3 electronic signing the pre-signature XAdES data.

In KeyInfo, the public key certificate of the public key, which corresponds to the private key used in the electronic signing by the client terminal 3, is set. In the public key certificate, for example, the public key, the owner of the public key, the certifying authority, the signature of the certifying authority, and the like are included.

In the signing target property, the hash value of the public key certificate is set.

In the SignedInfo, the original hash value and the hash value of the signing target property (below, the signing target property hash value) are set.

The ES is configured with the pre-signature XAdES data described above and the SignatureValue as elements.

In the SignatureValue, a signature value, where the SignedInfo has been signed using the private key by the client terminal 3, is set.

In this manner, signing is performed with regard to the pre-signature XAdES data by the client terminal 3 electronic signing with regard to the SignedInfo.

The ES-T is configured with the ES and the signature time stamp described above as elements.

In the signature time stamp, an STS (signature time stamp) which is issued with regard to the ES is set. In the time stamp server 5, the STS is the electronic signing of this using the private key of the time stamp server 5 by the current time and date being applied to the hash value of the SignatureValue.

An ES-XL (ES-XLong) is configured with the ES-T described above and the verification information as elements.

The verification information is configured using a group of certificates and a group of revocation information.

The group of certificates is configured by the public key certificate of the private key which is used in electronic signing by the client terminal 3 and the public key certificate on the certifying pass of the public key certificate of the private key which is used in the time stamp by the time stamp server 5.

In the certifying pass, verification of the public key certificate is confirmed by tracking back to the root certifying authority in a certification reliance chain where the root certifying authority issues a self-signed certificate, the root certifying authority issues a certificate for a child certifying authority, the child certifying authority issues a certificate for a grandchild certifying authority, . . . , and the final certifying authority issues a certificate to an individual, the owner of the certificate.

The group of revocation information is configured by revocation information of the public key certificate.

The ES-A (1st) is configured with the ES-XL described above and an ATS (1st) as elements.

The ATS (1st) (Archive Time Stamp) which is a first generation ATS, includes the information for verifying the ES-T, the original hash value, the electronic signature using the client terminal 3, and a hash value which is formed using a predetermined method from the time stamp (STS) using the time stamp server 5 and the like, and verification of the authenticity of the ES-XL using the ATS (1st) is possible.

The ES-A (2nd) is configured with the ES-A (1st) and the ATS (2nd) as elements.

The ATS (2nd) is a second generation ATS, includes the information for verifying the ES-A (1st), the original hash value, the electronic signature using the client terminal 3, and a hash value which is formed using a predetermined method from the time stamp (STS, ATS (1st)) using the time stamp server 5 and the like, and verification of the authenticity of the ATS (1st) using the ATS (2nd) is possible.

Although not shown, furthermore, it is possible to continue to further generations with an ES-A (3rd) with the ES-A (2nd) and an ATS (3rd) as elements, an ES-A (4th) with the ES-A (3rd) and an ATS (4th) as elements, . . . .

The long-term signature data which is configured as above is formed as follows.

First, until the ES-XL is formed, the ATS (1st) is acquired from among where the signature time stamp and the verification information are valid and the ES-A (1st) is configured.

Then, the ATS (2nd) is obtained before losing the validity of the ATS (1st) (before expiring of the expiry date or losing validity of the public key certificate of a time stamp token or before compromising of the related encryption algorithm).

Below, the acquisition of the next generation of ATS is repeated before the validity of the current ATS is lost in the same manner.

In this manner, the ATS is applied with regard to the ES-XL in a time series manner and the long-term signature data which is within the expiry date of the latest generation of ATS is acquired.

The verification of the long-term signature data which is formed in this manner will be described in detail later.

Figure 4:
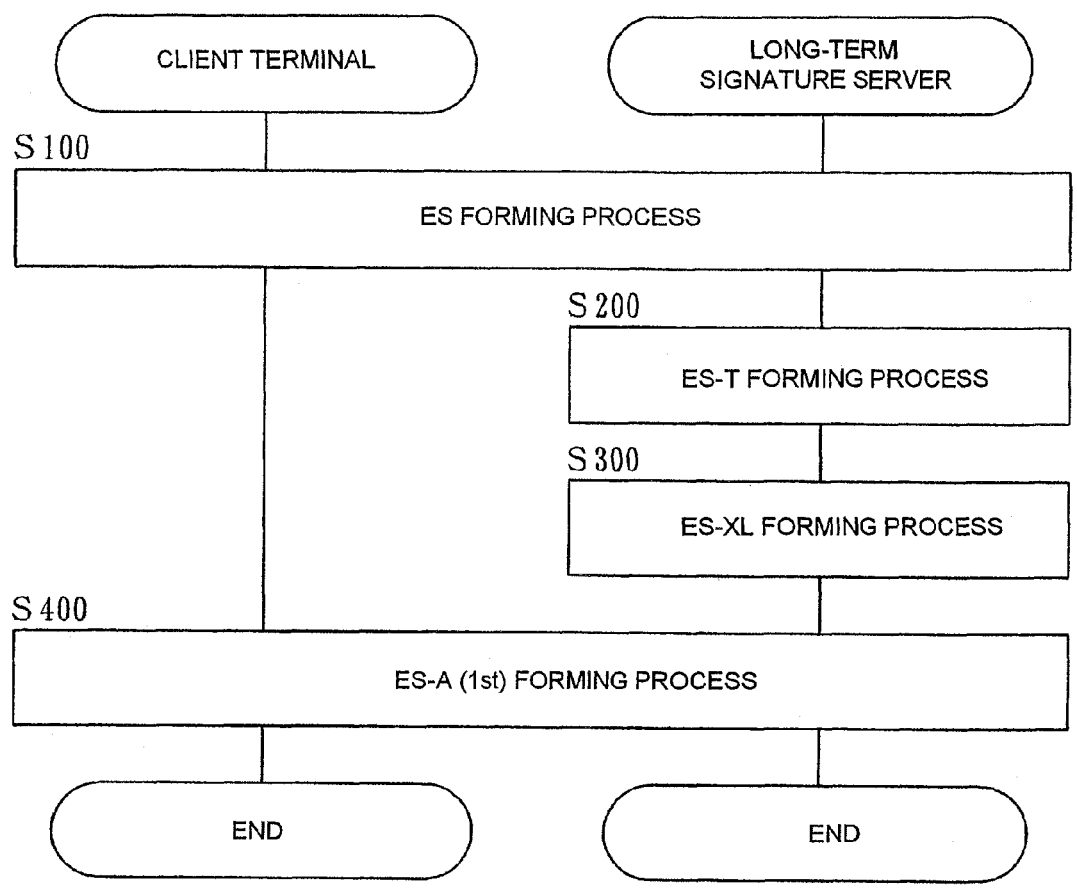
FIG. 4 is a flowchart for describing a sequence where a client terminal and a long-term signature server form long-term signature data.

FIG. 4 is a flowchart for describing a sequence where the client terminal 3 and the long-term signature server 2 form the long-term signature data.

Here, the process below is performed by the CPU 21 and the CPU 31 in accordance with a predetermined program.

First, the client terminal 3 and the long-term signature server 2 perform an ES forming process by cooperating (step 100).

Next, the long-term signature server 2 performs an ES-T forming process (step 200) and an ES-XL forming process (step 300).

Then, an ES-A (1st) forming process is performed (step 400) by the client terminal 3 and the long-term signature server 2 cooperating.

The long-term signature data (ES-A) is formed in this manner.

Then, although not shown, the ES-A (1st) which has been formed is updated with the ES-A (2nd) by the ATS (2nd) while valid being applied, and below, the generations overlap so that the validity of the long-term signature data is not lost.

Broadly divided, the long-term signature data formation sequence is configured from phases such as the above, and the sequence with details on each of the phases will be described below.

Figure 5:
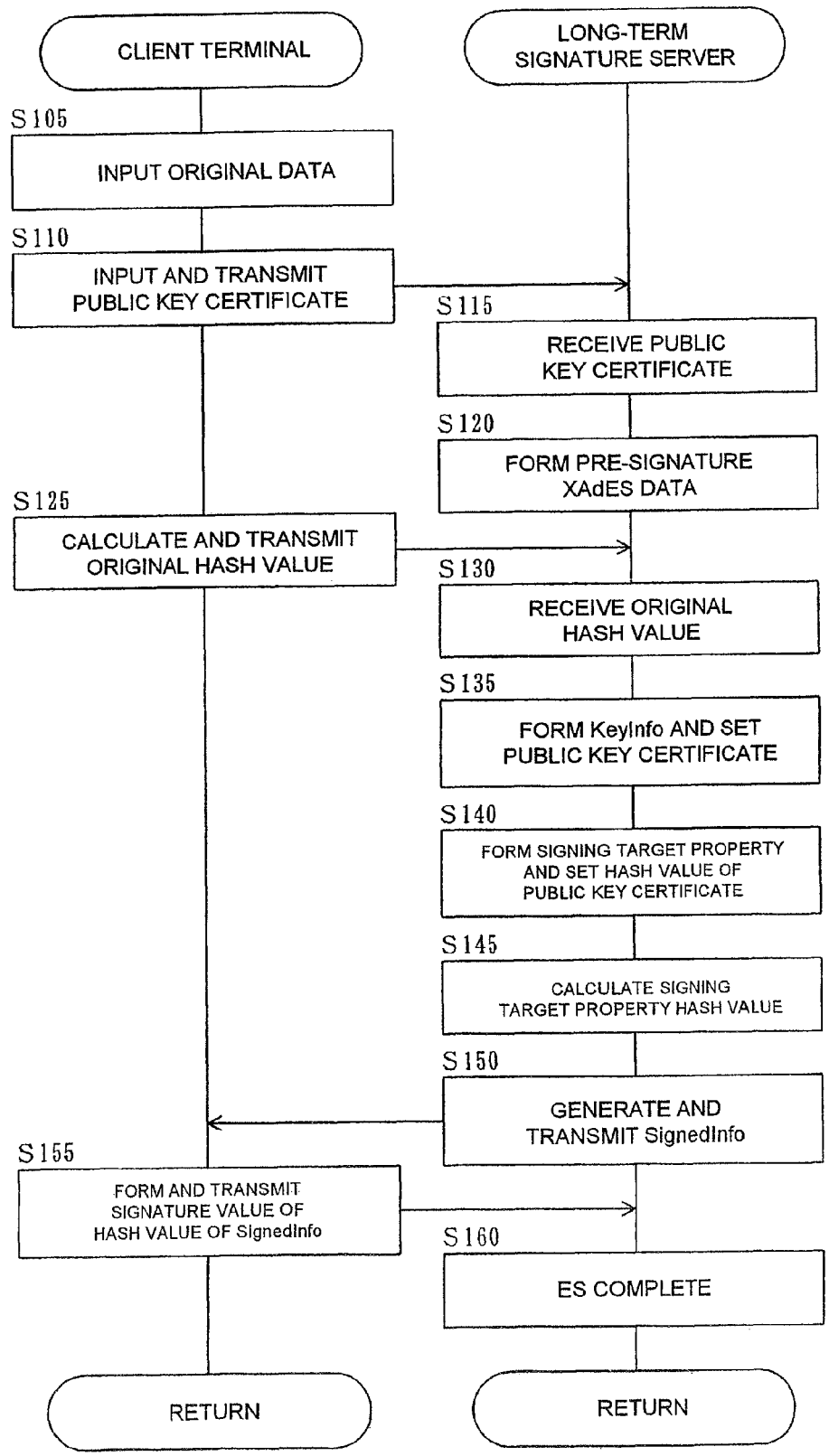
FIG. 5 is a flowchart for describing an ES forming process.

FIG. 5 is a flowchart for describing the ES forming process in step 100.

First, in a case where a necessary program (tools which perform the process below) is downloaded each time when client terminal 3 forms the long-term signature data, the downloading of the program from the long-term signature server 2 is executed in advance of the processing.

In a case where the client terminal 3 stores the program which is necessary already, this is executed.

Next, the client terminal 3 receives the inputting of the original data which is the long-term signing target (step 105).

This is performed by the user specifying the file of the original data which is the target and the like in the client terminal 3.

Next, the client terminal 3 receives the inputting of the public key certificate of the public key which corresponds to the private key which is used in signing and transmits to the long-term signature server 2 (step 110).

The inputting of the public key certificate is performed by the user specifying the public key certificate which is used and the like in the client terminal 3.

The long-term signature server 2 forms the pre-signature XAdES data using XML (step 120) when the public key certificate is received from the client terminal 3 (step 115).

In this manner, the long-term signature server 2 forms the long-term signature format in the RAM 25 using XML when a long-term signature data formation request is received from the client terminal 3, and below, the long-term signature data is completed by necessary data for the format being set.

Next, the client terminal 3 calculates the original hash value and transmits to the long-term signature server 2 (step 125).

In this manner, it is not necessary for the original data to be sent to the outside from the client terminal 3 since the client terminal 3 transmits the original hash value to the long-term signature server 2.

Then, the long-term signature server 2 receives the original hash value from the client terminal 3 (step 130).

First, the long-term signature server 2 forms an area for the KeyInfo in the pre-signature XAdES data and sets the public key certificate which has been received from the client terminal 3 in this (step 135) when the public key certificate and the original hash value are received from the client terminal 3 as described above.

Next, the long-term signature server 2 calculates the hash value of the public key certificate (below, the public key certificate hash value), forms an area for the signing target property in the pre-signature XAdES data, and sets the public key certificate hash value in this (step 140).

Next, the long-term signature server 2 calculates the signing target property hash value (step 145), forms an area for SignedInfo in the pre-signature XAdES data, and sets the original hash value and the signing target property hash value in this.

The long-term signature server 2 extracts the SignedInfo area from the pre-signature data XAdES data and transmits to the client terminal 3 (step 150) when the SignedInfo is formed in this manner.

Here, in the embodiment, the long-term signature server 2 transmits the SignedInfo area to the client terminal 3, but as a modification example, it is possible that there is a configuration so that the long-term signature server 2 calculates the hash value of the SignedInfo area and transmits the hash value to the client terminal 3.

In this case, it is sufficient if the client terminal 3 only encrypts the hash value using the private key.

It is sufficient if the calculation of the hash value is performed by either the long-term signature server 2 or the client terminal 3 in this manner.

The client terminal 3 calculates the hash value of the SignedInfo when the SignedInfo is received from the long-term signature server 2. Then, the hash value is electronically signed using the private key, the signature value is formed (that is, the encryption value is generated by the hash value of the SignedInfo being encrypted using the private key), and the electronic signature value is transmitted to the long-term signature server 2 (step 155). Due to this, there is electronic signing of the pre-signature XAdES data using the private key of the client terminal 3.

When the signature value is received from the client terminal 3, the long-term signature server 2 completes the ES by adding this to the pre-signature XAdES data (step 160).

In this manner, the long-term signature server 2 is able to form the ES while the original data and the private key are held in the client terminal 3.

Figure 6:
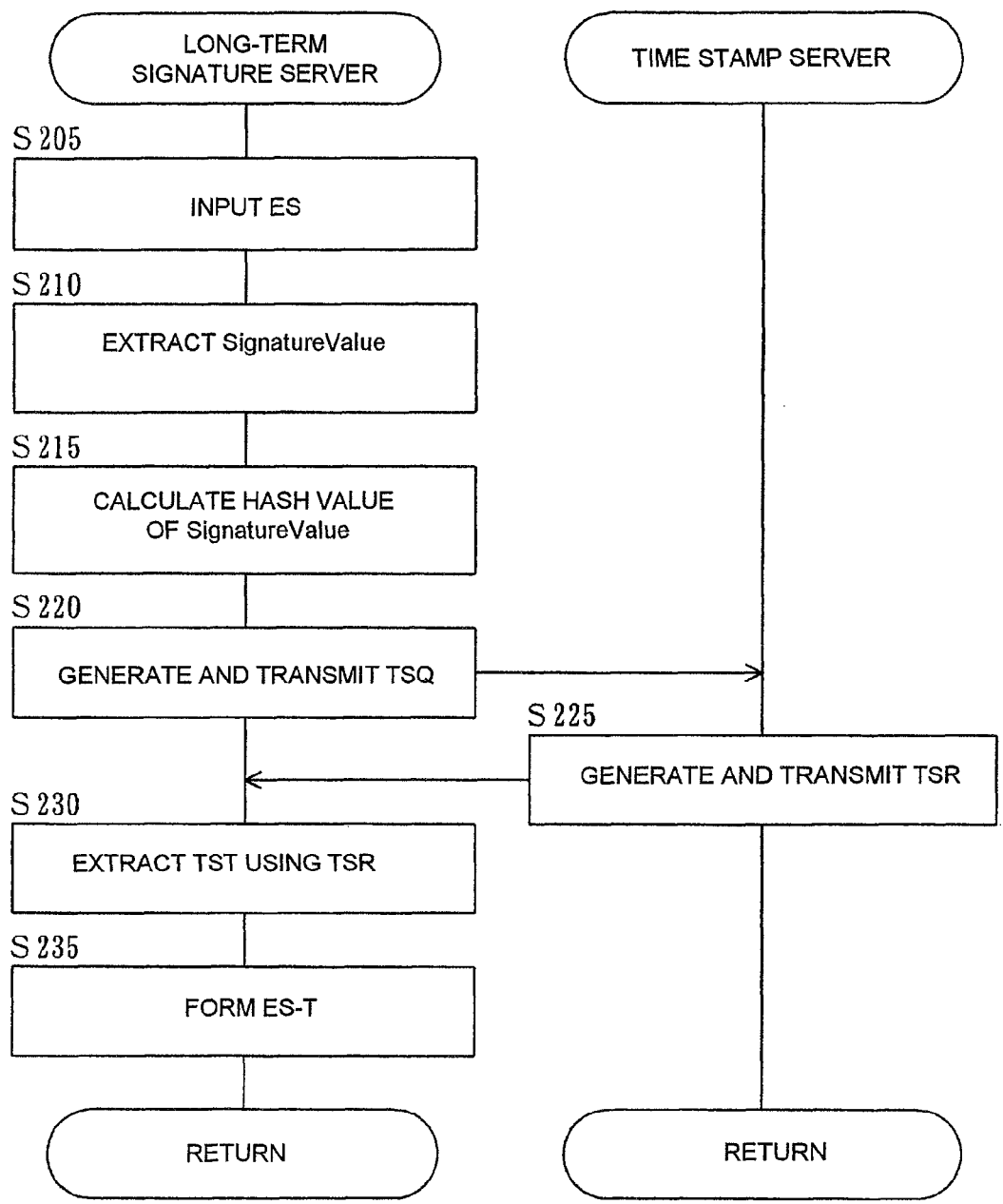
FIG. 6 is a flowchart for describing an ES-T forming process.

FIG. 6 is a flowchart for describing the ES-T forming process in step 200.

First, the long-term signature server 2 inputs the ES which has been formed in step 100 as the processing target (step 205). At this time, a configuration where the ES is verified is possible.

Next, the long-term signature server 2 extracts the SignatureValue area from the ES (step 210) and the hash value of the SignatureValue is calculated (step 215).

Next, the long-term signature server 2 generates a TSQ (Time-stamp Request) for requesting a time stamp with regard to the hash value of the SignatureValue and transmits to the time stamp server 5 (step 220).

The time stamp server 5 generates a TST (Time Stamp Token) by signing using the private key after the current date and time is applied when the TSQ is received.

Then, the time stamp server 5 generates a TSR (Time-stamp Response) using the TST which has been issued and transmits to the long-term signature server 2 (step 225).

When described in more detail, the TST is in the TSR and the TST which is taken out of the TSR is called an STS (signature time stamp), an ATS (archive time stamp), or the like.

The long-term signature server 2 receives the TSR from the time stamp server 5 and extracts the TST from the TSR (step 230).

Then, the long-term signature server 2 forms the signature time stamp area in the ES-T, sets the TST as the STS (signature time stamp), and completes the formation of the ES-T (step 235).

Figure 7:
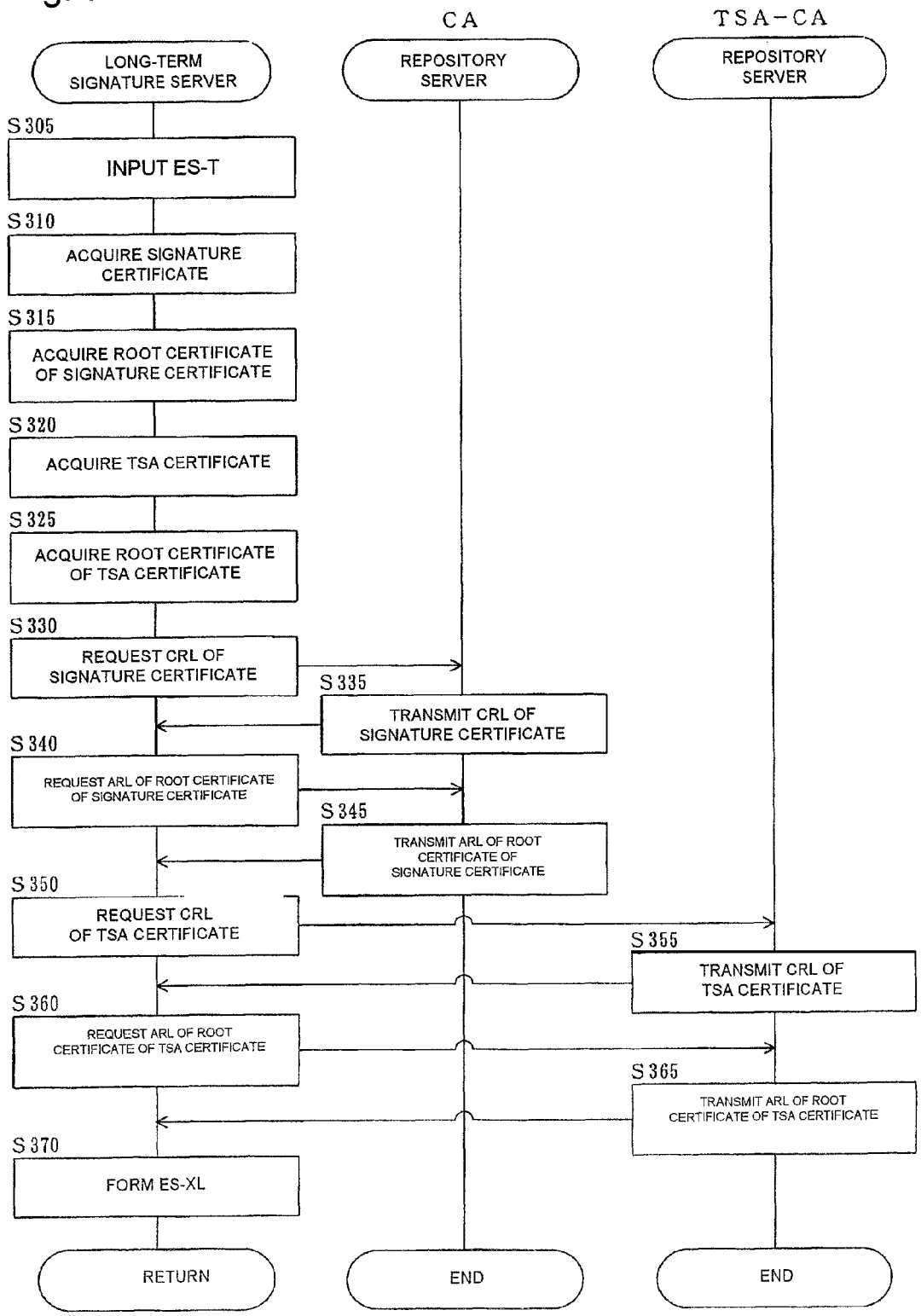
FIG. 7 is a flowchart for describing an ES-XL forming process.

FIG. 7 is a flowchart for describing the ES-XL forming process in step 300.

First, the long-term signature server 2 inputs the ES-T which has been formed in step 200 as the processing target (step 305).

Next, the long-term signature server 2 maps the necessary certificate information from the ES-T and collects as follows.

First, the long-term signature server 2 acquires the public key certificate of the client terminal 3, that is, the signature certificate (step 310), and furthermore, acquires the root certificate of the signature certificate (step 315).

Next, the long-term signature server 2 acquires the TSA certificate for certifying the signature time stamp (step 320), and next, acquires the root certificate of the TSA certificate (step 325). The group of certificates which are acquisition targets are stored in the long-term signature server 2.

Next, the long-term signature server 2 maps the revocation information which is necessary for the confirmation that the public key certificate of the client 3, the public key certificate of the STS, and the certificate of the certifying authority for verifying these are not listed up in the voiding list and collects these as follows.

Here, there is a possibility that the voiding state of the signature certificate is not registered in the revocation information due to the relationship between the office processing of the voiding procedures and the revocation information disclosure timing irrespective of whether a voiding application has been performed with regard to the certifying authority due to the reason that, for example, the correct signature key owner has lost the key.

In a case such as this, the long-term signature server 2 collects the revocation information after a certain period of time has passed after the acquisition of the signature time stamp or after the formation of the group of certificates (for example, 24 hours or a number of days which is based on the operation policy of the certifying authority which issued the signature certificate) since time is necessary until the revocation information is registered since the voiding.

First, the long-term signature server 2 accesses the CA repository server 7 and requests a CRL (Certificate Revocation List) of the signature certificates which have been collected (step 330).

On the other hand, the repository server 7 transmits the CRL of the signature certificates to the long-term signature server 2 (step 335).

Here, the CRL is a list which lists the certificates which have been voided and determines whether or not the certificate is valid by referencing the certificate and the CRL.

Next, the long-term signature server 2 requests an ARL (Authority Revocation List) of the root certificate of the signature certificates in the repository server 7 (step 340).

On the other hand, the repository server 7 transmits the ARL of the root certificate of the signature certificate to the long-term signature server 2 (step 345).

Here, the ARL is a list such as the self-signature certificates which have been voided. Since the CA of the root is positioned at the top of the certificate reliance chain, the CA of the root certifies by a self-signature certificate by itself. Then, it is possible to determine whether or not the root certificate is valid by referencing the root certificate and the ARL.

The validity of the signature certificate is able to be verified using the CRL of the signature certificate, the validity of the root certificate of the signature certificate is able to be verified using the ARL of the root certificate of the signature certificate, and it is possible for the authenticity of the signature to be verified using the client terminal 3 by the verification of the signature certificate and the root certificate of the signature certificate.

Next, the long-term signature server 2 accesses the repository server 6 of the TSA-CA and requests the CRL of the TSA certificate (step 350).

On the other hand, the repository server 6 transmits the CRL of the TSA certificate to the long-term signature server (step 355).

Next, the long-term signature server 2 requests the ARL of the root certificate of the TSA certificate from the repository server 6 (step 360).

On the other hand, the repository server 6 transmits the ARL of the root certificate of the TSA certificate to the long-term signature server 2 (step 365).

The validity of the TSA certificate is able to be verified using the CRL of the TSA certificate, the validity of the root certificate of the TSA certificate is able to be verified using the ARL of the root certificate of the TSA certificate, and it is possible for the authenticity of the STS to be verified by the verification of the TSA certificate and the root certificate of the TSA certificate.

As above, when the group of certificates and the group of revocation information are collected, the client terminal 3 configures the certifying pass using the stages of the certificate reliance chain using this and forms the ES-XL by adding this to the ES-T (step 370).

Figure 8:
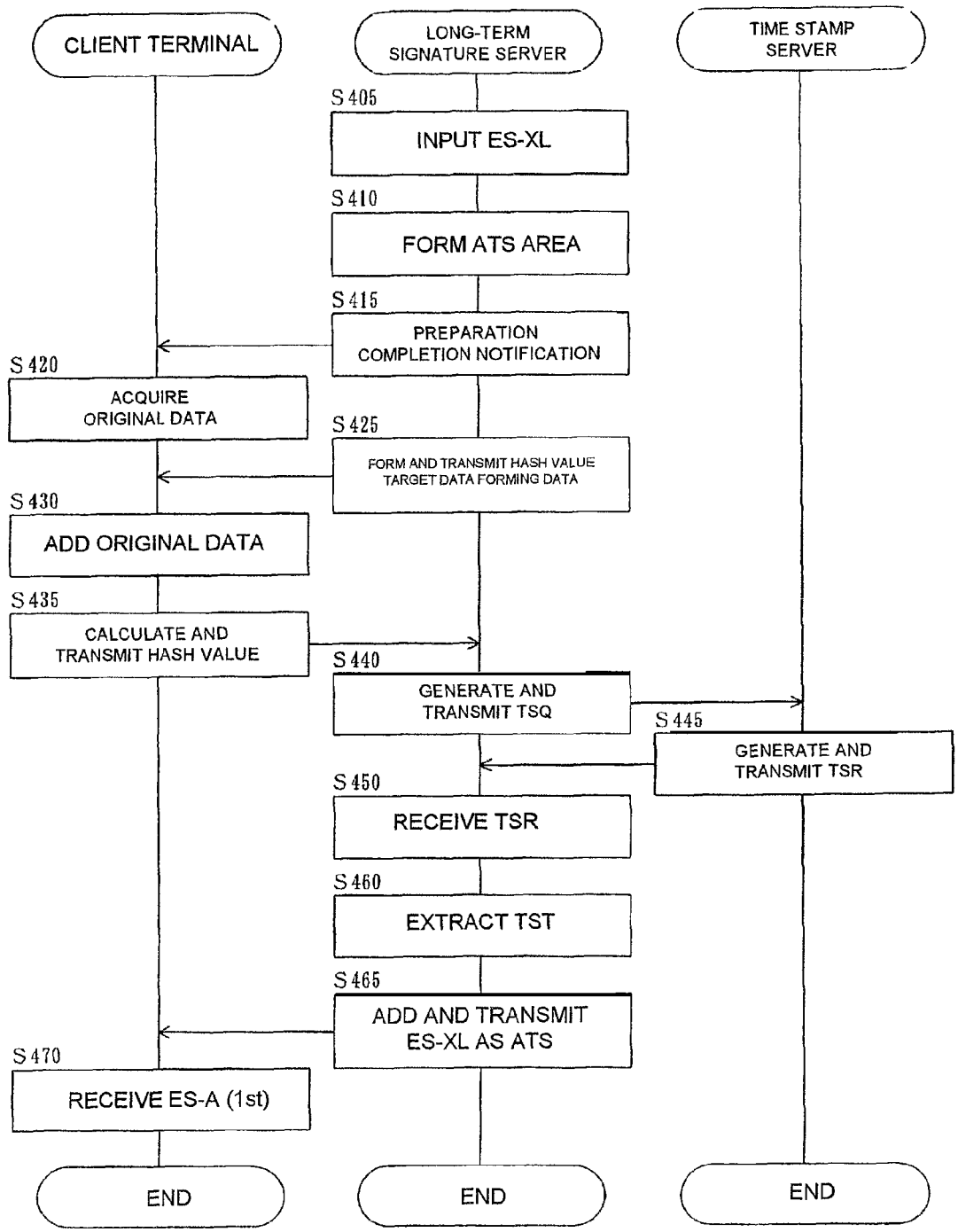
FIG. 8 is a flowchart for describing an ES-A (1st) forming process.

FIG. 8 is a flowchart for describing the ES-A (1st) forming process in step 400.

First, the long-term signature server 2 inputs the ES-XL which was formed in step 300 as the processing target (step 405). At this time, it is possible to configure the long-term signature server 2 so as to verify the ES-XL.

Next, the long-term signature server 2 forms an ATS area in the long-term signature data (step 410).

The long-term signature server 2 forms the ATS area and transmits a preparation completion notification to the client terminal 3 when the preparation of forming the ES-A (1st) is complete (step 415).

The client terminal 3 reads and acquires the original data when the notification is received (step 420).

The long-term signature server 2 forms hash value target data forming data for ES-A (1st) when the preparation completion notification is transmitted to the client terminal 3 (step 425).

In detail, the long-term signature server 2 extracts the signing target property, the SignedInfo, the SignatureValue, the KeyInfo, the STS, the group of certificates, and the group of revocation information from the ES-XL, couples these by setting according to a predetermined format, and generates the hash value target data forming data.

Here, the hash value target data forming data excludes the original data from the hash value target data.

When the signature value target data forming data is formed, the long-term signature server 2 transmits this to the client terminal 3 (step 425).

When the hash value target data forming data is received from the long-term signature server 2, the client terminal 3 adds the original data which is read in step 420 to this (step 430) and the hash value target data is formed.

Next, the client terminal 3 calculates the hash value of the hash value target data and transmits the hash value to the long-term signature server 2 (step 435).

When the hash value of the hash value target data is received, the long-term signature server 2 generates the TSQ for requesting the time stamp for this and transmits to the time stamp server 5 (step 440).

The time stamp server 5 takes out the hash value of the hash value target data from the TSQ when the TSQ is received and the TST is generated by the current date and time being applied to this and by signing using the private key.

Then, the time stamp server 5 generates the TSR using the TST and transmits to the long-term signature server 2 (step 445).

When the TSR is received from the time stamp server 5 (step 450), the long-term signature server 2 extracts the TST from this (step 460).

Then, the long-term signature server 2 adds the TST which has been extracted to the ES-XL as the ATS (1st), the ES-A (1st) is generated and transmitted to the client terminal 3 (step 465).

The client terminal 3 receives the ES-A (1st) from the long-term signature server 2 and stores (step 470).

In this manner above, it is possible to form the long-term signature data (ES-A (1st)) using the long-term signature server 2 while the original data and the private key (signature key) are held in the inner portion of the client terminal 3.

In the manner above, the ES-A (1st) which has been formed is held at the client side, but it is necessary for the ATS (2nd) to be added to the ES-A (1st) and to be updated to the ES-A (2nd) before the validity of the ATS (1st) is lost. Therefore, a sequence where of updating to the ES-A (2nd) will be described next.

Figure 9:
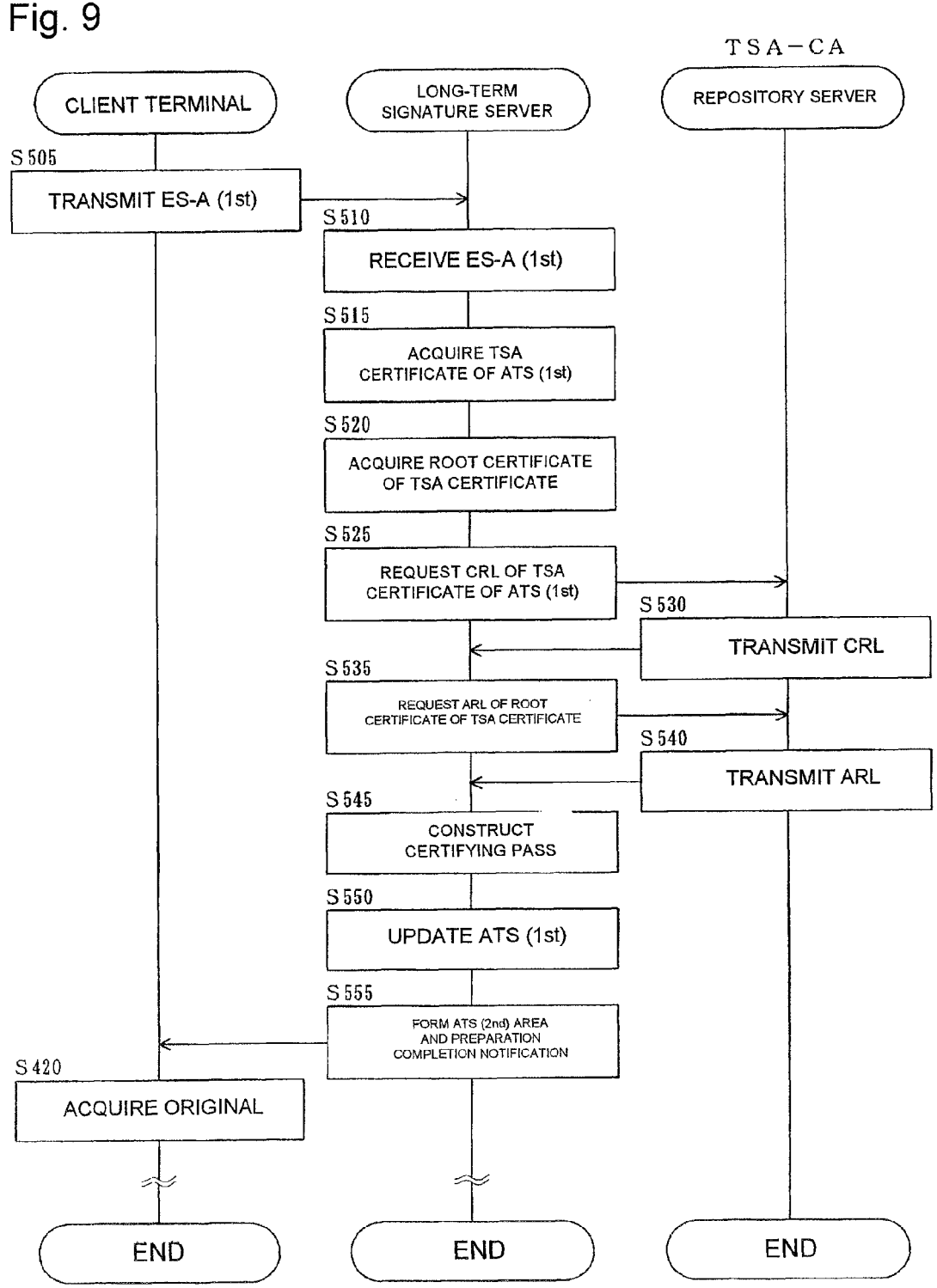
FIG. 9 is a flowchart for describing a sequence where an ES-A (2nd) is formed.

FIG. 9 is a flowchart for describing a sequence where the ES-A (2nd) is formed.

First, the client terminal 3 transmits the ES-A (1st) to the long-term signature server 2 (step 505). When the ES-A (1st) is input in the client terminal 3, it is possible that this is verified.

The long-term signature server 2 receives the ES-A (1st) from the client terminal 3 (step 510).

Then, the long-term signature server 2 maps the necessary certificate information from the ES-A (1st) to the ATS (1st) and collects these as below.

First, the long-term signature server 2 acquires the TSA certificate of the ATS (1st) (step 515), and furthermore, acquires the root certificate of the TSA certificate (step 520). These certificates are stored in the long-term signature server 2.

Next, the long-term signature server 2 accesses the repository server 6 of the TSA-CA, requests the CRL of the TSA certificate of the ATS (1st) (step 525), and the repository server 6 transmits the CRL to the long-term signature server 2 (step 530).

Then the long-term signature server 2 receives the CRL.

Next, the long-term signature server 2 requests the ARL of the root certificate of the TSA certificate of the ATS (1st) from the repository server 6 (step 535) and the repository server 6 transmits the ARL of the root certificate to the long-term signature server 2 (step 540).

Then, the long-term signature server 2 receives the ARL.

Next, the long-term signature server 2 configures a certifying path from the group of certificates (the TSA certificate and the root certificate of the TSA certificate) and the group of revocation information (CRL and ARL) (step 545).

Next, the long-term signature server 2 adds the group of certificates and the group of revocation information which have been collected respectively to the certificates area and the crls area of the ATS (1st) and updates the ATS (1st) (step 550).

Next, the long-term signature server 2 forms an area for the ATS (2nd) in the ES-A (1st) where the ATS (1st) has been updated and a preparation completion notification that the preparation for the forming of the ES-A (2nd) is set is transmitted to the client terminal 3 (step 555).

The processing beyond this is the same as step 420 and below of FIG. 8 and it is possible to form the ES-A (2nd) using the long-term signature server 2 while the original data and the private key are held in the inner portion of the client terminal 3.

That is, the long-term signature server 2 forms the hash value target data forming data and transmits to the client terminal 3.

Then, the client terminal 3 adds the original data to the hash value target data forming data, calculates the hash value, and transmits the hash value to the long-term signature server 2.

The long-term signature server 2 issues a time stamp by the hash value being transmitted to the time stamp server 5 and the ES-A (2nd) is formed by the ES-A (1st) being added to this.

The later generations such as the ES-A (3rd) and ES-A (4th) are formed in the same manner.

The following effects are able to be acquired using the embodiment which has been described above.

(1) It is possible to realize a protocol where the long-term signature data formation sequence is performed by the sequence of the long-term signature server 2 and the sequence of the client terminal 3 being separated.

(2) It is not necessary to send the private key to the outside of the client terminal 3 in order to perform the signing using the client terminal 3.

(3) It is not necessary to send the original data to the outside of the client terminal 3 since the original data is transmitted to the long-term signature server 2 by calculating the hash value.

(4) It is possible to reduce the burden on the client terminal 3 since only the processing which uses the private key and the original data is performed by the client terminal 3 and the processing which is a high burden on the computer such as the analysis of the XML and the acquisition of the time stamp and verification information is performed by the long-term signature server 2.

(5) The communication burden is able to be reduced since transmission to the long-term signature server 2 is the original hash value and the like even with, for example, the original data which exceeds several megabits such as large-scale design diagrams or audio or video data.

(6) It is not necessary for the user to perform operation management (monitoring of logs, monitoring of voiding, recovery processing, and the like) since it is possible for the formation of the long-term signature data to be outsourced while the private key and the original data are held by the user side and it is not necessary to construct a long-term signature system for a user environment.

(7) Network setting (the opening of an IP, a port, and the like) is not necessary for acquiring the time stamp and the revocation information from the user environment since the long-term signature system is not constructed with a user environment.

(8) It is not necessary to hold the information such as the root certificate of the signature certificate and the root certificate of the TSA certificate for acquiring the certifying pass in the user environment since it is held by the long-term signature server 2. As a result, it is not necessary to register the new certifying authority certificate (the root certificate or intermediate certificate) in the user environment even in a case where, for example, the certifying authority of the TSA changes.

(9) It is not necessary for the user side of the client terminal 3 to have a contract with the TSA since the time stamp is acquired by the long-term signature server 2.

(10) The long-term signature server 2 supports and it is not necessary for the user side to support when updating the version of the long-term signature format or when there is generation of compromising of the encryption algorithm.

(11) By outsourcing the generation of the long-term signature data to the long-term signature server 2, it is possible to provide a solution which satisfies the desires of a customer due to the long-term signature system being necessary but the number of processing documents being not able to be estimated such as no wanting to incur a high initial cost, not wanting to have a server system in the company since it is not possible to secure employees for operating the long-term signature system, and not wanting to take the private key and the original data outside of the company.

(12) It is possible to support extension in the validity of the electronic document and compromising of the encryption algorithm by using the long-term signature format.

(13) It is possible to provide a system which performs signing using the signature key with regard to the signing target document, forms the ES-T by applying the signature time stamp, collects and applies the necessary verification information with regard to the ES-T (certifying pass and the revocation information), and performs the process of applying the archive time stamp and forming the ES-A by securing security.

(14) It is possible to reduce the connection destinations of the client terminal 3 and it is possible to prevent an increase in security holes due to many connection destinations since the connection of the client terminal 3 is set to the long-term signature server 2 and there is not connection with the time stamp server 5 and the repository servers 6 and 7.

However, the processing of the client terminal 3 and the long-term signature server 2 as described above is one example where two demands of (1) the high burden processing being performed by the long-term signature server 2 and reducing the burden on the client terminal 3 as much as possible and (2) the communication destinations of the client terminal 3 being the long-term signature server 2 in order to reduce the communication destinations of the client terminal 3, and it is possible to configure so that a portion of the processing of the long-term signature server 2 is performed by the client terminal 3 as the modification example.

For example, in the ES forming process of step 100 (FIG. 4), it is possible to perform all of the processing using the client terminal 3.

In addition, in the ES-T forming process of step 200, it is possible that the processing other than the acquisition of the time stamp (steps 220 and 225) is performed using the client terminal 3.

In this case, the client terminal 3 transmits only the data necessary for the time stamp processing to the long-term signature server 2 and the long-term signature server 2 acquires the time stamp with regard to this using the time stamp server 5 and transmits to the client terminal 3.

Here, setting the communication destination of the client terminal 3 as the long-term signature server 2 is for a desire to reduce the communication destinations of the client terminal 3 as much as possible.

Furthermore, in the ES-XL forming process in step 300, the processing other than the processing of collecting the revocation information from the repository servers 6 and 7 (steps 330 to 365) is able to be performed using the client terminal 3 since it is necessary that the revocation information is acquired from outside.

In this case, performing of the management of the certificates by the client terminal 3 is necessary, and in addition, performing of the confirmation of whether or not the necessary revocation information has been acquired by the client terminal 3 is also necessary in the starting of the ES-XL forming process, and at this time, it is necessary to entrust the checking of the revocation information acquisition to the long-term signature server 2.

Then, in this case, the client terminal 3 transmits the URL (Uniform Resource Locators) and the like of the acquisition destination of the revocation information which is necessary to the long term signature server 2 and the long-term signature server 2 collects the revocation information using this and transmits to the client terminal 3.

In addition, in the ES-A (1st) forming process in step 400, the processing other than the processing for acquiring the time stamp (step 440 and 445) is able to be performed using the client terminal 3.

In this case, the client terminal 3 transmits only the data necessary for the time stamp processing to the long-term signature server 2 and the long-term signature server 2 acquires the time stamp with regard to this using the time stamp server 5 and transmits to the client terminal 3.

Here, setting the communication destination of the client terminal 3 as the long-term signature server 2 is for a desire to reduce the communication destinations of the client terminal 3 as much as possible.

Furthermore, in the ES-A updating process in FIG. 9, the processing other than the processing of collecting the revocation information from the repository server 6 (steps 525 to 540) and the processing of acquiring the time stamp which is omitted in the diagram (steps 440 and 445) is able to be performed using the client terminal 3.

In this case, performing of the management of the certificates by the client terminal 3 is necessary, and in addition, performing of the confirmation of whether or not the necessary revocation information has been acquired by the client terminal 3 is also necessary in the starting of an ES-A updating process, and at this time, it is necessary to entrust the checking of the revocation information acquisition to the long-term signature server 2.

Then, in this case, the client terminal 3 transmits the URL (Uniform Resource Locators) and the like of the acquisition destination of the revocation information which is necessary to the long-term signature server 2 and the long-term signature server 2 collects the revocation information using this and transmits to the client terminal 3.

It is possible to acquire the following configuration due to the embodiment described above.

In the long-term signature system 1, the long-term signature server 2 functions as a long-term signature server and the client terminal 3 functions as a long-term signature terminal.

The pre-signature XAdES data or the SignedInfo functions as signing target data since the client terminal 3 gives a signature to the pre-signature XAdES data by signing the SignedInfo using the private key.

In addition, in relation to the signature with regard to the SignedInfo, the SignedInfo may be transmitted to the client terminal 3, the hash value of the SignedInfo may be calculated by the client terminal 3, and the hash value may be signed, or the hash value of the SignedInfo may be calculated by the long-term signature server 2 and transmitted to the client terminal 3 and the client terminal 3 may sign the hash value.

In the case of the former, the SignedInfo functions as the signature data, and in the case of the latter, the hash value of the SignedInfo functions as the signature data.

The long-term signature server 2 is provided with signing target data acquisition means for acquiring the signing target data and signature data transmission means for transmitting the signature data for the electronic signing of signing target data which has been acquired to the long-term signature terminal in order for the long-term signature server 2 to generate the pre-signature XAdES data and to transmit the signature data for signing the SignedInfo (the SignedInfo or the hash value of the SignedInfo) to the client terminal 3.

Then, the long-term signature server 2 is provided with signature value reception means for receiving an electronic signature value of the signing target data which was generated using the signature data which has been transmitted from the long-term signature terminal in order to receive the signature value of the SignedInfo from the client terminal 3, and is provided with time stamp acquisition means for acquiring the time stamp with regard to the electronic signature value which has been received in order to be issued with the STS using the TST from the time stamp server 5 with regard to the pre-signature XAdES data and the signature value.

The ES-T functions as basic signature data and the long-term signature server 2 is provided with signature data generation means for generating the basic signature data (ES-T) using, at least, the signing target data which has been acquired (the pre-signature XAdES data), the electronic signature value which has been received (the signature value), and the time stamp (STS) which has been acquired in order for the long-term signature server 2 to generate the ES-T from the pre-signature XAdES data, the signature value, and the STS.

In addition, the long-term signature server 2 is provided with function value and certificate reception means for receiving a function value (the original hash value) which is calculated using a predetermined function (a hash function) on the original data and a public key certificate which includes the public key which corresponds to the private key which is used in generation of the electronic signature from the long-term signature terminal in order to receive the public key certificate of the public key which corresponds to the private key which is used in the original data hash value and the signature from the client terminal 3 and generate the XAdES data using this, and the signing target data acquisition means generates the signing target data (the XAdES) using, at least, the function value (the original hash value) and the public key certificate which have been received.

Furthermore, the long-term signature server 2 is provided with verification information acquisition means for acquiring the verification information for verifying the public key certificate and the time stamp which have been received in order to generate the ES-XL by collecting the group of certificates and the group of revocation information as the verification information of the public key certificate which is received from the client terminal 3 and the public key certificate of the STS and adding to the ES-T, and the signature data generation means adds the verification information which has been acquired to the basic signature data (the ES-T).

The long-term signature server 2 is provided with long-term verification information acquisition means for acquiring the long-term verification information (ATS (1st)) for verifying the basic signature data (the ES-XL) for a predetermined period of time since it is information where the ES-A (1st) is generated by adding the ATS (1st) to the ES-XL and the ES-XL is verified during a valid period of time, and the signature data generation means generates the long-term signature data (ES-A (1st)) by adding the basic signature data which has been generated to the long-term verification information which has been acquired.

The long-term signature server 2 is provided with long-term verification information forming information transmission means which transmits long-term verification information forming information (the hash value target data forming data) for forming the long-term verification information to the long-term signature terminal in order to form the hash value target data forming data and transmit to the client terminal 3 when the ATS (1st) is formed, to calculate the hash value by the client terminal 3 adding the original data to this, and to acquire the ATS (1st) by the long-term signature server 2 applying the time stamp to this, and long-term verification information forming function value reception means for receiving a long-term verification information forming function value (the hash value), which has been calculated using a predetermined function by adding the original data in the long-term verification information forming information which has been transmitted from the long-term signature terminal, from the long-term signature terminal, and the long-term verification information acquisition means acquires the long-term verification information (the ATS (1st)) by the time stamp being applied to the long-term verification information forming function value which has been received.

In addition, the long-term signature server 2 is provided with long-term signature data reception means for receiving the long-term signature data from the long-term signature terminal and long-term verification information extraction means for extracting the (latest) long-term verification information from the long-term signature data which has been received from the extraction and analysis of the latest ATS of the long-term signature data by receiving the long-term signature data for which the period of validity is to be extended from the client terminal 3.

Then, the long-term signature server 2 is provided with further long-term verification information acquisition means for acquiring further long-term verification information (the next-generation ATS) for verifying the long-term verification information (the latest ATS) which has been extracted for a predetermined period of time in order to acquire the next-generation ATS for verifying of the latest ATS for a predetermined period of time and adding to the long-term signature data and to extend the period of validity of the long-term signature data using this, and the signature data generation means updates the long-term signature data by adding the further long-term verification information (the next-generation ATS) which has been acquired to the long-term signature which has been received (the long-term signature data which has been given the latest ATS).

In more detail, the long-term signature server 2 is provided with further long-term verification information forming information transmission means for transmitting further long-term verification information forming information for forming further long-term verification information to the long-term signature terminal and further long-term verification information forming function value reception means for receiving a further long-term verification information forming function value, which is calculated using a predetermined function by adding the original data to the further long-term verification information forming information which has been transmitted, from the long-term signature terminal in order so that the long-term signature server 2 generates the information for forming the next-generation ATS and transmits to the client terminal 3 (steps 510 to 555) and the client terminal 3 calculates the hash value by adding the original data to this and transmits the function value to the long-term signature server 2.

Then, in the long-term signature server 2, the further long-term verification information acquisition means acquires the further long-term verification information by applying the time stamp to the further long-term verification information forming function value which has been received in order to acquire the next-generation ATS by applying the time stamp to the hash value (the function value) which has been received from the client terminal 3.

In addition, in the signing target property of the pre-signature XAdES data, the meta data which is included in the public key certificate hash value and the signing target data includes the function value (the public key certificate hash value) which calculates the public key certificate which has been received using a predetermined function.

In addition, in the embodiment where the necessary program is downloaded from the long-term signature server 2 each time when the client terminal 3 forms long-term signature data, the long-term signature server 2 is provided with a program transmission means for transmitting the long-term signature terminal program which, using a computer, realizes, to the long-term signature terminal, an electronic signature function which electronically signs using a private key, a public key certificate transmission function which transmits a public key certificate of a public key which corresponds to the private key to the long-term signature server, a function value transmission function which transmits a function value which is calculated from the original data using a predetermined function to the long-term signature server, a signature data reception function which receives signature data (the SignedInfo or the hash value of the SignedInfo) for electronically signing the signing target data, which has been generated using the public key certificate and the function value which have been transmitted, from the long-term signature server, and a signature value transmission function which electronically signs the signing target data by the electronic signature function using the signature data which has been received and transmits an electronic signature value from the electronic signature to the long-term signature server.

On the other hand, the client terminal 3 is provided with electronic signature means for electronically signing using a private key, public key certificate transmission means for transmitting the public key certificate of the public key which corresponds to the private key to the long-term signature server, and function value transmission means for transmitting the function value (the original hash value) which calculates original data using a predetermined function (the hash function) to the long-term signature server in order for electronic signing by the electronic data being encryption using the private key and the public key certificate of the public key which corresponds to the private key is transmitted to the long-term signature server 2 or the original hash value is calculated and transmitted to the long-term signature server 2.

Then, the client terminal 3 is provided with signature data reception means for receiving signature data (the SignedInfo and the hash value of the SignedInfo) for electronically signing the signing target data (the pre-signature XAdES data), which has been generated using the public key certificate and the function value which have been transmitted, from the long-term signature server 2, and signature value transmission means for electronically signing the signing target data by the electronic signature means using the signature data which has been received and for transmitting an electronic signature value from the electronic signature to the long-term signature server 2.

In addition, the hash value target data forming data functions as long-term verification information forming information for the forming of the long-term verification information (ATS) and the client terminal 3 is provided with long-term verification information forming information reception means for receiving long-term verification information forming information (hash value target data forming data) for forming long-term verification information, which verifies basic signature data which includes a function value, a public key certificate, and an electronic signature value which have been transmitted for a predetermined period of time, from the long-term signature server in order to receive the hash value target data forming data from the long-term signature server 2 when the long-term signature server 2 forms the ATS (1st).

Then, the client terminal 3 is provided with long-term verification information forming function value generation means for generating a long-term verification information forming function value (the hash value) by adding the original data to the long-term verification information forming information which has been received and by calculating long-term verification information forming information where the original data has been added using a predetermined function (the hash function), and long-term verification information forming function value transmission means for transmitting the long-term verification information forming function value which has been generated to the long-term signature server in order to calculate the hash value by the original data being added to the hash value target data forming data and to transmit the hash value to the long-term signature server 2.

In addition, the client terminal 3 transmits the long-term signature data where the period of validity has been extended to the long-term signature server 2 and receives information (the hash value target data forming data) for forming the next-generation ATS which verifies the latest generation of the ATS from the long-term signature server 2.

As a result, the client terminal 3 is provided with long-term signature data transmission means for transmitting long-term signature data (the long-term signature data which is a target for extension of the period of validity), which includes the basic signature data including the function value, the public key certificate, and the electronic signature value which have been transmitted and the long-term verification information for verifying these for a predetermined period of time, to the long-term signature server and further long-term verification information forming information reception means for receiving further long-term verification information forming information (the hash value target data forming data for the next generation of the ATS) for forming further long-term verification information (the next-generation of the ATS), which verifies the long-term verification information of the long-term signature data which has been transmitted for a predetermined period of time, from the long-term signature server.

Then, the client terminal 3 is provided with further long-term verification information forming function value verification information forming function value (the hash value of the next-generation ATS) by adding the original data and calculating further long-term verification information forming information where the original data has been added using a predetermined function (the hash function) and further long-term verification information forming function value transmission means for transmitting the further long-term verification information forming function value which has been generated to the long-term signature server 2 in order to calculate the hash value by adding the original data to the hash value target data forming data and to transmit the hash value to the long-term signature server 2.

Figure 10:
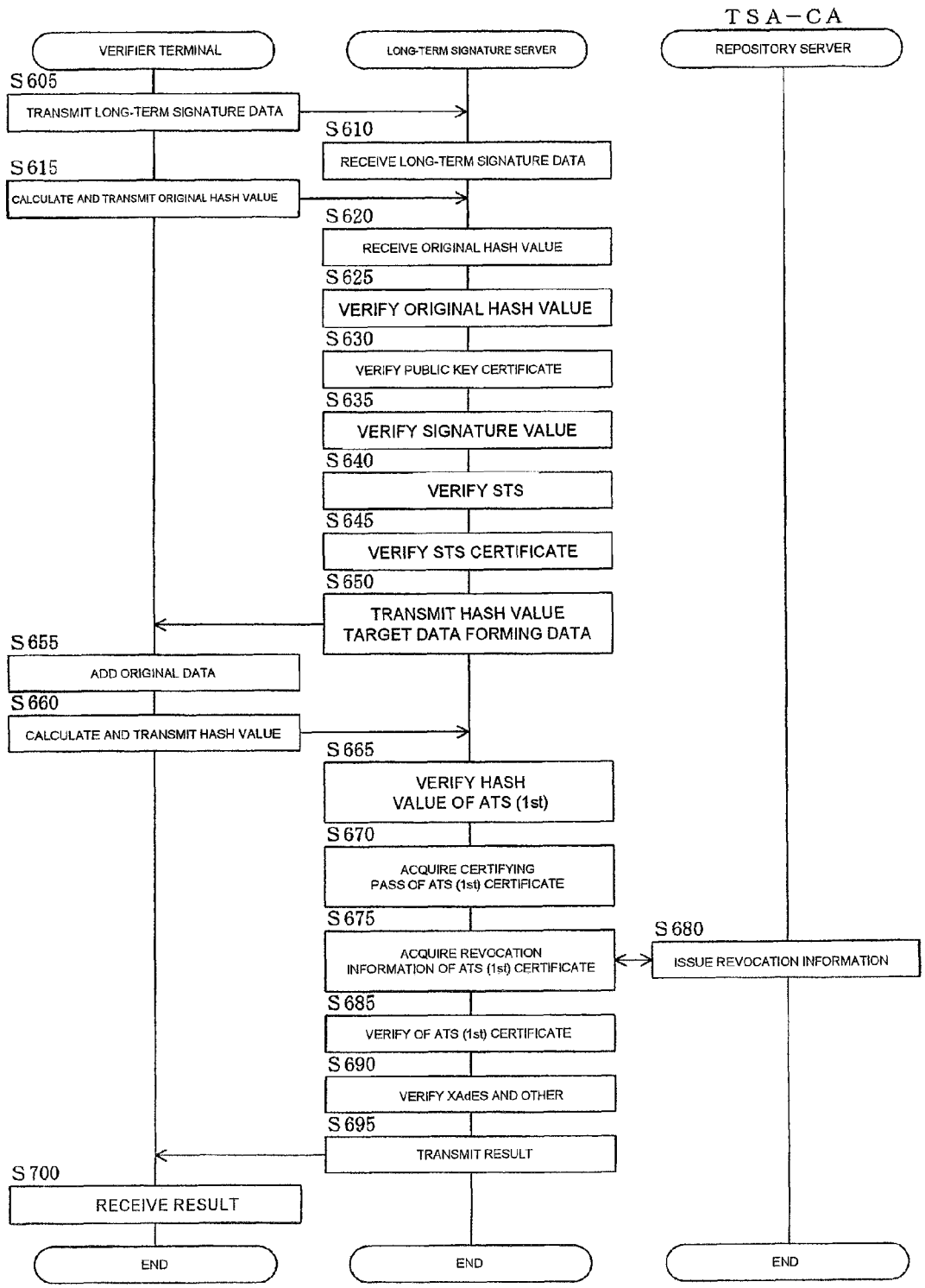
FIG. 10 is a flowchart for describing a long-term signature data verification process.
Figure 11:
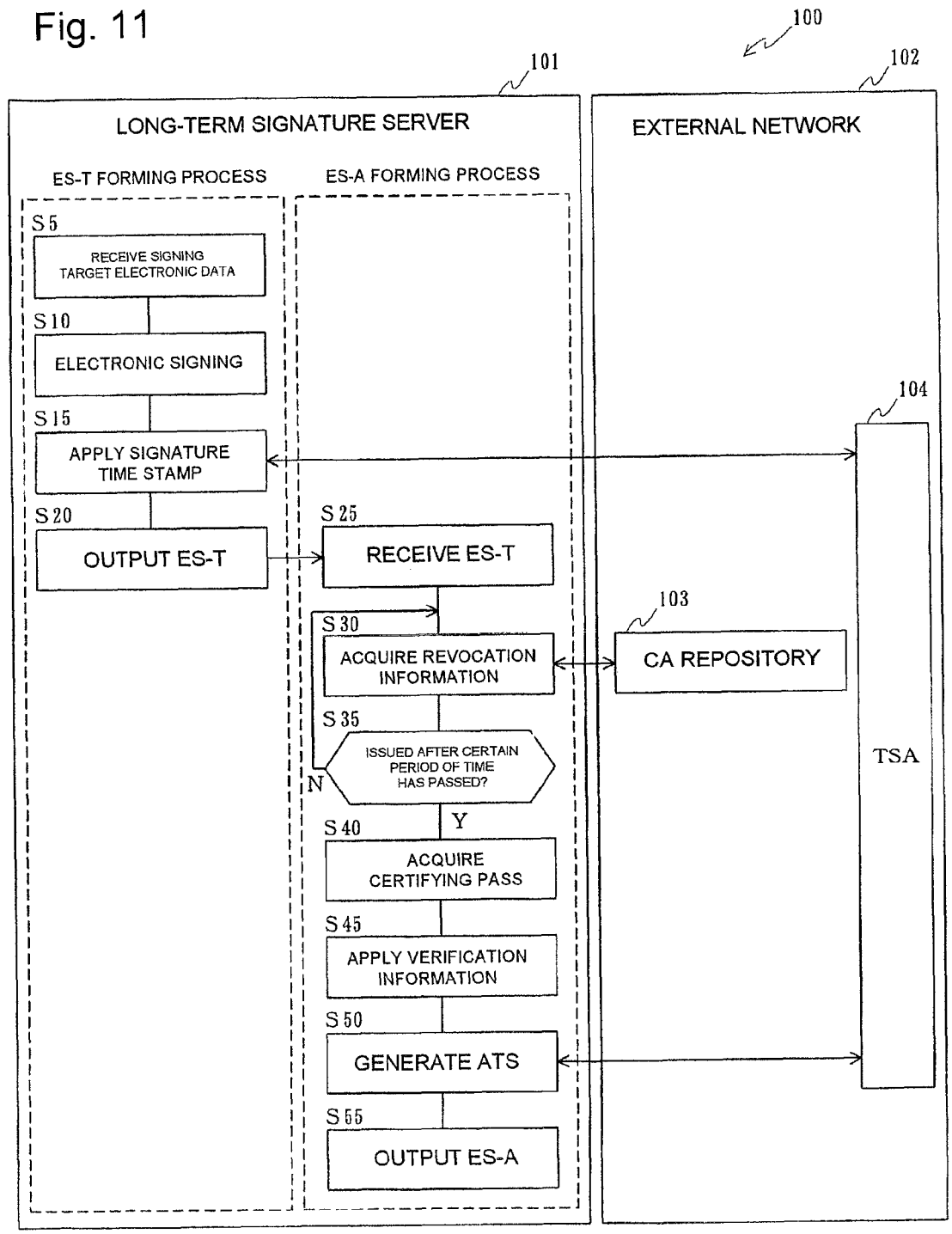
FIG. 11 is a flowchart for describing a configuration example of a long-term signature system in the related art.
Figure 12:
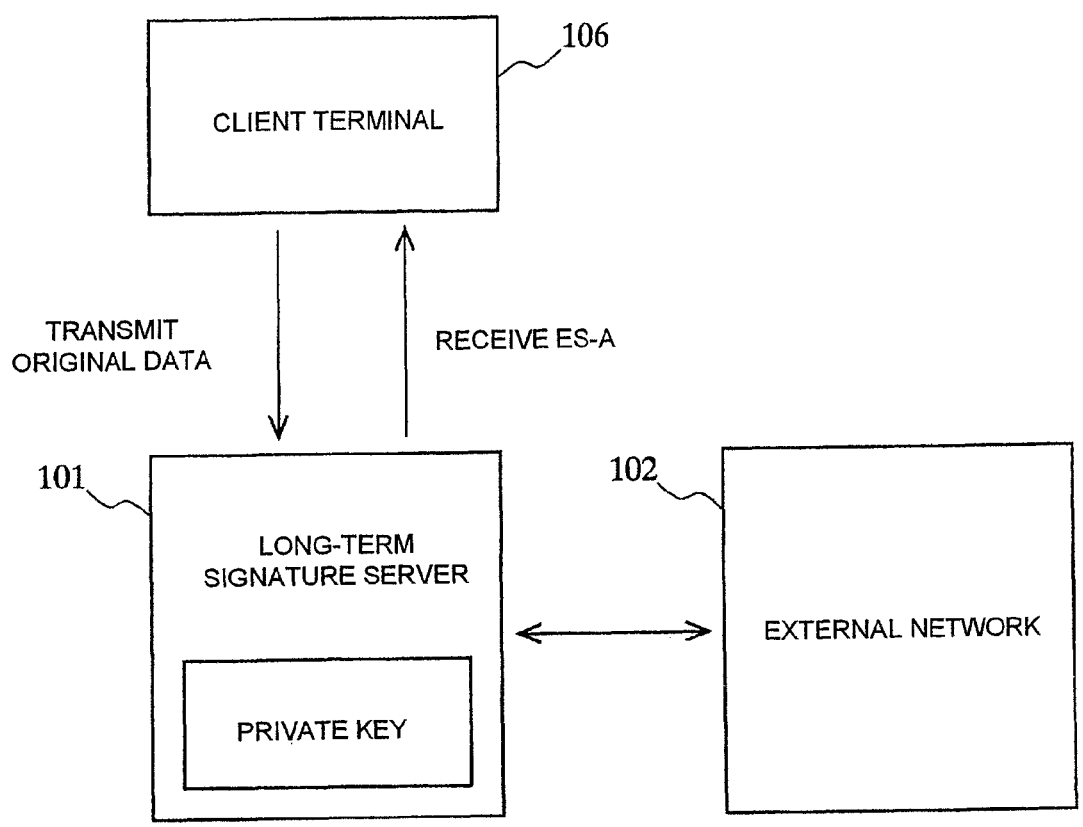
FIG. 12 is a flowchart for describing a case where a third party operates a long-term signature server in an example in the related art.

Next, the verification method of the long-term signature data will be described using the flowchart of FIG. 10.

The verifier terminal below is a terminal of a user who acquires the long-term signature data and the original data and verifies the original data using the long-term signature data and the hardware configuration is the same as the client terminal 3.

For example, a case is considered where the latter receives the long-term signature data and the original data formed by the former and the latter verifies this using the verifier terminal.

The verifier terminal stores the long-term signature data and the original data.

First, the verifier terminal transmits the long-term signature data to the long-term signature server 2 (step 605) and the long-term signature server 2 receives this (step 610).

Next, the verifier terminal calculates the hash value of the original data and transmits to the long-term signature server 2 (step 615) and the long-term signature server 2 receives this (step 620).

Next, the long-term signature server 2 verifies the original hash value (step 625).

The process is performed by comparing the original hash value which is transmitted from the verifier terminal and the original hash value in the XAdES of the long-term signature data and confirming that both match.

Next, the long-term signature server 2 performs verification of the public key certificate (the signature certificate) (step 630).

The verification is performed by the connection of the certifying pass using the group of certificates which is included in the verification information and the group of revocation information and the confirming that the certificates in the certifying pass have not been voided.

Next, the long-term signature server 2 verifies the signature value (step 635).

The verification is performed by the encryption of the signature value of the SignatureValue using the public key which is taken out from the public key certificate and the calculation of the hash value of the SignedInfo and the confirming that the encrypted value and the hash value match.

Next, the long-term signature server 2 verifies the STS (step 640).

The verification is performed by the calculation of the hash value of the SignatureValue and the confirmation that this and the hash value which is written in the STS match.

Next, the long-term signature server 2 verifies the STS certification (signature time stamp certificate) (step 645).

Other than the confirmation by decrypting the TSA signature value of the TSA certificate, the verification is performed by the connection of the certifying pass using the group of certificates which is included in the verification information and the group of revocation information and the confirming that the certificates in the certifying pass have not been voided.

Next, the long-term signature server 2 forms the hash value target data forming data by forming the data prior to the coupling of the original data with the ATS target data from the data which is included in the ES-XL and transmits this to the verifier terminal (step 650).

When the hash value target data forming data is received, the verifier terminal couples and adds this to the original data and forms hash value target data (step 655).

Next, the verifier terminal calculates the hash value of the hash value target data and transmits to the long-term signature server 2 (step 660).

When the hash value is received from the verifier terminal, by confirming that this and the hash value which is written in the ATS (1st) match, the long-term signature server 2 verifies the hash value of the ATS (1st) (step 665).

Next, the long-term signature server 2 acquires the certificate for forming the certifying pass of the certificate of the ATS (1st) (the root certificate) from within its own server (step 670).

Next, the long-term signature server 2 acquires the revocation information of the certificate in the certifying pass from the repository server 6 (steps 675 and 680).

Then, when the certifying pass is connected, the long-term signature server 2 performs verification of the ATS (1st) certification by confirming that the certificate on the certifying pass has not been voided (step 685).

Next, other than this, the long-term signature server 2 performs verification of the XAdES (step 690).

The verification is performed by the confirmation that the consistency of the timing between the respective certificates, the respective revocation information, and the respective time stamps and the consistency of the formats.

The long-term signature server 2 generates a verification result using the verification above and transmits to the verifier terminal (step 695).

Then, the verifier terminal receives the verification result from the long-term signature server 2 and presents to the verifier (step 700).

Here, there is verification of the ATS in the same manner even in a case where there are the further lower generations of ATS (2nd) and ATS (3rd).

As above, according to the verification method above, it is possible to perform verification of the long-term signature data using the long-term signature server 2 while the verifier holds the original data in the verifier terminal.

As a result, for example, in a case where the former presents the original data and the long-term signature data to the latter and there is a desire not to transfer the original data to other than the former and the latter, it is possible to confirm the authenticity of the original data using the long-term signature data without the original data being presented to the long-term signature server 2.

In addition, for example, evidence of the ES-A (1st) is not lost until the compromising of the algorithm which is used in the generation of the ATS (1st) even when the algorithm which is used in the generation of the ES-T has been compromised.

Then, in a case where there is a possibility of the algorithm which is used in the generation of the ATS (1st) being compromised, the evidence is not lost if the ATS (2nd) is further applied to the latest algorithm.

Hereinafter, it is possible for the evidence to be transferred in the future by overlapping the generation using the latest algorithm.

It is possible to acquire the following configuration using the verification method which is described above.

A long-term signature verification server which is provided with long-term signature data reception means for receiving long-term signature data, which is configured using signing target data, verification information for verifying the signing target data, and long-term verification information which includes long-term verification information for verifying the signing target data and the verification information for a predetermined period of time, for verifying the authenticity of original data from a verifier terminal, long-term verification information forming information transmission means for forming long-term verification information forming information by extracting predetermined information which includes the long-term signature data and for transmitting the long-term verification information forming information which has been formed to the verifier terminal, long-term verification information forming function value receiving means for receiving a long-term verification information forming function value, which is calculated using a predetermined function by adding the original data to the long-term verification information forming information which has been transmitted, from the verifier terminal, and long-term verification information verification means for verifying the long-term verification information using the long-term verification information forming function value which has been received (first configuration).

The long-term signature verification server according to the first configuration which is provided with signing target data verification means for verifying the signing target data using the verification information, and the long-term verification information verification means verifies the long-term verification information after the verification of the signing target data verification means (second configuration).

In this manner, the embodiment is able to verify the signature with regard to the original data at the server side without the original data being transferred to the server side.

In this case, the terminal transmits the function value using the predetermined function of the original data and the signature data of the original data (the signature value where the function value of the original data is encrypted using the private key and the public key certificate of the public key which corresponds to the private key) and the server decrypts the signature value using the public key, takes out the function value, and determines the authenticity of the original data (if the function value is authentic, the original data is also authentic) by comparing the function value which has been taken out and the function value which is transmitted by the terminal and confirms the authenticity of the public key certificate using the certificate which has related to the certifying pass.

Furthermore, in a case where the signature data is the long-term signature, the server forms the information which excludes the original data from the information for forming the function value for confirming the long-term signature using the information which configures the signature data and transmits to the terminal.

On the other hand, the terminal calculates the function value using the predetermined function by adding the original data to the information, transmits to the server, and the server verifies the authenticity of the long-term signature using the function value.

REFERENCE SIGNS LIST

1 LONG-TERM SIGNATURE SYSTEM
2 LONG-TERM SIGNATURE SERVER
3 CLIENT TERMINAL
4 INTERNET
5 TIME STAMP SERVER
6 REPOSITORY SERVER
7 REPOSITORY SERVER

The invention claimed is:

1. A long-term signature server comprising:
signing target data acquisition means for acquiring signing target data;
signature data transmission means for transmitting to a long-term signature terminal signature data for the electronic-signing of the acquired signing target data;
signature value reception means for receiving an electronic signature value of the signing target data generated using the signature data transmitted from the long-term signature terminal;
time stamp acquisition means for acquiring a time stamp corresponding to the received electronic signature value; and
signature data generation means for generating basic signature data using at least the acquired signing target data, the received electronic signature value, and the acquired time stamp.

2. The long-term signature server according to claim 1, wherein the signing target data includes a function value calculated from the public key certificate which has been received using a predetermined function.

3. The long-term signature server according to claim 1, wherein the long-term signature terminal includes program transmission means for transmitting a long-term signature terminal program having instructions for causing a computer to realize:
an electronic signature function which electronically signs using a private key;
a public key certificate transmission function which transmits to the long-term signature server a public key certificate of a public key corresponding to the private key;
a function value transmission function which transmits to the long-term signature server a function value calculated from the original data using a predetermined function;
a signature data reception function which receives from the long-term signature server signature data for electronically signing the signing target data generated using the transmitted public key certificate and function value; and
a signature value transmission function which electronically signs the signing target data by the electronic signature function using the received signature data and which transmits an electronic signature value from the electronic signature to the long-term signature server.

4. The long-term signature server according to claim 1, further comprising:
function value and certificate reception means for receiving a function value calculated from original data using a predetermined function and a public key certificate which includes a public key corresponding to a private key used in generation of the electronic signature value from the long-term signature terminal,
wherein the signing target data acquisition means acquires the signing target data by generating the signing target data using at least the received function value and public key certificate.

5. The long-term signature server according to claim 4, wherein the signing target data includes a function value calculated from the public key certificate which has been received using a predetermined function.

6. The long-term signature server according to claim 4, wherein the long-term signature terminal includes program transmission means for transmitting a long-term signature terminal program having instructions for causing a computer to realize:
an electronic signature function which electronically signs using a private key;
a public key certificate transmission function which transmits to the long-term signature server a public key certificate of a public key corresponding to the private key;
a function value transmission function which transmits to the long-term signature server a function value calculated from the original data using a predetermined function;
a signature data reception function which receives from the long-term signature server signature data for electronically signing the signing target data generated using the transmitted public key certificate and function value; and
a signature value transmission function which electronically signs the signing target data by the electronic signature function using the received signature data and which transmits an electronic signature value from the electronic signature to the long-term signature server.

7. The long-term signature server according to claim 4, further comprising:
verification information acquisition means for acquiring verification information for verifying the received public key certificate and the time stamp,
wherein the signature data generation means adds the verification information which has been acquired to the basic signature data.

8. The long-term signature server according to claim 7, further comprising:
long-term verification information acquisition means for acquiring long-term verification information for verifying the basic signature data for a predetermined period of time,
wherein the signature data generation means generates the long-term signature data by adding the acquired long-term verification information to the generated basic signature data.

9. The long-term signature server according to claim 8, further comprising:
long-term verification information forming information transmission means for transmitting long-term verification information forming information for forming the long-term verification information to the long-term signature terminal; and
long-term verification information forming function value reception means for receiving a long-term verification information forming function value calculated using a predetermined function by adding the original data to the long-term verification information forming information transmitted from the long-term signature terminal,
wherein the long-term verification information acquisition means acquires the long-term verification information by the time stamp being applied to the received long-term verification information forming function value.

10. The long-term signature server according to claim 8, further comprising:
long-term signature data reception means for receiving the long-term signature data from the long-term signature terminal;
long-term verification information extraction means for extracting the long-term verification information from received the long-term signature data; and
another long-term verification information acquisition means for acquiring further long-term verification information for verifying the extracted long-term verification information for a predetermined period of time,
wherein the signature data generation means updates the long-term signature data by adding the acquired further long-term verification information to the received long-term signature data.

11. The long-term signature server according to claim 10, further comprising:
another long-term verification information forming information transmission means for transmitting further long-term verification information forming information for forming further long-term verification information to the long-term signature terminal; and
another long-term verification information forming function value reception means for receiving from the long-term signature terminal a further long-term verification information forming function value calculated using a predetermined function by adding the original data to the transmitted further long-term verification information forming information,
wherein the another long-term verification information acquisition means acquires the further long-term verification information by applying the time stamp to the received further long-term verification information forming function value.

12. A long-term signature terminal comprising:
electronic signature means for electronically signing using a private key;
public key certificate transmission means for transmitting to a long-term signature server a public key certificate of a public key corresponding to the private key;
function value transmission means for transmitting to the long-term signature server a function value calculated from original data using a predetermined function;
signature data reception means for receiving from the long-term signature server signature data for electronically signing the signing target data generated using the transmitted public key certificate and function value; and
signature value transmission means for electronically signing the signing target data by the electronic signature means using the received signature data and for transmitting an electronic signature value from the electronic signature to the long-term signature server.

13. The long-term signature terminal according to claim 12, further comprising:
long-term verification information forming information reception means for receiving from the long-term signature server long-term verification information forming information for forming long-term verification information which verifies basic signature data including a function value, a public key certificate, and an electronic signature value which have been transmitted for a predetermined period of time;

long-term verification information forming function value generation means for generating a long-term verification information forming function value by adding the original data to the received long-term verification information forming information and by calculating long-term verification information forming information where the original data has been added using a predetermined function; and long-term verification information forming function value transmission means for transmitting to the long-term signature server the generated long-term verification information forming function value.

14. The long-term signature terminal according to claim 13, further comprising:

long-term signature data transmission means for transmitting to the long-term signature server long-term signature data, which includes the basic signature data including the function value, the public key certificate, and the electronic signature value which have been transmitted and the long-term verification information for verifying the same for a predetermined period of time;

another long-term verification information forming information reception means for receiving from the long-term signature server further long-term verification information forming information for forming further long-term verification information which verifies the long-term verification information of the long-term signature data transmitted for a predetermined period of time;

another long-term verification information forming function value generation means for generating a further long-term verification information forming function value by adding the original data to the received further long-term verification information forming information and calculating further long-term verification information forming information where the original data has been added using a predetermined function; and another long-term verification information forming function value transmission means for transmitting the generated further long-term verification information forming function value to the long-term signature server.

15. A computer-readable medium storing a long-term signature verification program having instructions for causing a computer to realize:

an electronic signature function which electronically signs using a private key;

a public key certificate transmission function which transmits a public key certificate of a public key corresponding to the private key to the long-term signature server;

a function value transmission function which transmits to the long-term signature server a function value calculated from the original data using a predetermined function to;

a signature data reception function which receives from the long-term signature server signature data for electronically signing the signing target data generated using the transmitted public key certificate and function value; and a signature value transmission function which electronically signs the signing target data by the electronic signature function using the received signature data and which transmits an electronic signature value from the electronic signature to the long-term signature server.

* * * * *